(12) United States Patent
Noro et al.

(10) Patent No.: US 9,516,702 B2
(45) Date of Patent: Dec. 6, 2016

(54) HONEYCOMB STRUCTURE

(71) Applicant: NGK INSULATORS, LTD., Nagoya (JP)

(72) Inventors: Takashi Noro, Nagoya (JP); Kazumi Nagareda, Nagoya (JP); Tsuyoshi Watanabe, Nagoya (JP); Shuhei Kuno, Nagoya (JP); Tadato Ito, Nagoya (JP)

(73) Assignee: NGK Insulators, Ltd., Nagoya-City (JP)

( * ) Notice: Subject to any disclaimer, the term of this patent is extended or adjusted under 35 U.S.C. 154(b) by 671 days.

(21) Appl. No.: 13/922,809

(22) Filed: Jun. 20, 2013

(65) Prior Publication Data

US 2013/0277360 A1 Oct. 24, 2013

Related U.S. Application Data

(63) Continuation of application No. PCT/JP2011/079937, filed on Dec. 22, 2011.

(30) Foreign Application Priority Data

Dec. 24, 2010 (JP) .................................. 2010-288678

(51) Int. Cl.
*H05B 3/10* (2006.01)
*H05B 3/06* (2006.01)
(Continued)

(52) U.S. Cl.
CPC ................. *H05B 3/06* (2013.01); *B01J 35/04* (2013.01); *F01N 3/2026* (2013.01);
(Continued)

(58) Field of Classification Search
CPC .......... B01D 2255/9155; B01D 53/94; F01N 3/2026; F01N 3/2828; H05B 2203/024; H05B 3/06; H05B 3/141; H05B 3/42; B01J 35/04; Y02T 10/26
USPC .................... 219/205, 553; 60/300; 422/173
See application file for complete search history.

(56) References Cited

U.S. PATENT DOCUMENTS 5,063,029 A   11/1991   Mizuno et al.
5,200,154 A   4/1993    Harada et al.
(Continued)

FOREIGN PATENT DOCUMENTS

CN   101031348 A      9/2007
DE   10 2011 083 2 A1   3/2012
(Continued)

OTHER PUBLICATIONS

U.S. Appl. No. 14/018,710, filed Sep. 5, 2013, Hosoi et al.
(Continued)

*Primary Examiner* — Dana Ross
*Assistant Examiner* — Joseph Iskra
(74) *Attorney, Agent, or Firm* — Burr & Brown, PLLC

(57) ABSTRACT

There is disclosed a honeycomb structure including a tubular honeycomb structure part having porous partition walls with which a plurality of cells are formed and an outer peripheral wall, and a pair of electrode parts arranged on a side surface of the honeycomb structure part, an electrical resistivity of the honeycomb structure part is from 10 to 200 Ωcm, each of the pair of electrode parts is formed into a band-like shape extending in a direction in which the cells extend, in a cross section perpendicular to the extending direction of the cells, the one electrode part is disposed opposite to the other electrode part via the center of the honeycomb structure part, and the electrode part has portions having a thickness of 0 to 70% of the maximum thickness of the electrode part.

17 Claims, 12 Drawing Sheets

(51) Int. Cl.
*F01N 3/20* (2006.01)
*F01N 3/28* (2006.01)
*H05B 3/14* (2006.01)
*H05B 3/42* (2006.01)
*B01J 35/04* (2006.01)
*B01D 53/94* (2006.01)

(52) U.S. Cl.
CPC ............ *F01N 3/2828* (2013.01); *H05B 3/141* (2013.01); *H05B 3/42* (2013.01); *B01D 53/94* (2013.01); *B01D 2255/9155* (2013.01); *H05B 2203/024* (2013.01); *Y02T 10/26* (2013.01)

(56) References Cited

U.S. PATENT DOCUMENTS

| | | | |
|---|---|---|---|
| 5,245,825 A | | 9/1993 | Ohhashi et al. |
| 5,266,278 A | | 11/1993 | Harada et al. |
| 5,288,975 A | | 2/1994 | Kondo |
| RE35,134 E | | 12/1995 | Mizuno et al. |
| 6,097,011 A | * | 8/2000 | Gadkaree ............... B01D 53/02 219/202 |
| 2003/0134084 A1 | | 7/2003 | Ichikawa et al. |
| 2005/0095179 A1 | | 5/2005 | Kasai et al. |
| 2005/0229564 A1 | | 10/2005 | Okubo et al. |
| 2007/0068128 A1 | | 3/2007 | Oshimi et al. |
| 2007/0189741 A1 | * | 8/2007 | Gruetzmann ............ H05B 3/42 392/485 |
| 2011/0250096 A1 | * | 10/2011 | Ido ....................... F01N 3/0222 422/177 |
| 2011/0250097 A1 | * | 10/2011 | Ido ......................... B03C 3/455 422/177 |
| 2012/0076698 A1 | | 3/2012 | Ishihara |
| 2013/0043236 A1 | | 2/2013 | Sakashita et al. |
| 2013/0043237 A1 | | 2/2013 | Sakashita et al. |
| 2013/0045137 A1 | | 2/2013 | Sakashita et al. |

FOREIGN PATENT DOCUMENTS

| | | |
|---|---|---|
| JP | 04-067588 A1 | 3/1992 |
| JP | 04-280086 A1 | 10/1992 |
| JP | 08-141408 A1 | 6/1996 |
| JP | 2931362 B2 | 8/1999 |
| JP | 2003-260322 A | 9/2003 |
| JP | 2004-068684 A1 | 3/2004 |
| JP | 4136319 B2 | 8/2008 |
| JP | 2010-229977 A1 | 10/2010 |
| JP | 2010-229978 A1 | 10/2010 |
| JP | 2011-207116 A1 | 10/2011 |
| WO | 2011/125815 A1 | 10/2011 |
| WO | 2011/125816 A1 | 10/2011 |
| WO | 2011/125817 A1 | 10/2011 |

OTHER PUBLICATIONS

U.S. Appl. No. 13/628,521, filed Sep. 27, 2012, Sakashita et al.
U.S. Appl. No. 13/628,672, filed Sep. 27, 2012, Sakashita et al.
International Search Report and Written Opinion dated Feb. 7, 2012.
Chinese Office Action, Chinese Application No. 201180062346.9, dated Sep. 9, 2014 (7 pages).
Extended European Search Report (Application No. 11851723.4) dated Sep. 12, 2016.

* cited by examiner

HONEYCOMB STRUCTURE

BACKGROUND OF THE INVENTION

1. Field of the Invention

The present invention relates to a honeycomb structure, and more particularly, it relates to a honeycomb structure which is a catalyst support and also functions as a heater when a voltage is applied thereto and which has an excellent heat shock resistance.

2. Description of Related Art

Heretofore, a honeycomb structure made of cordierite, onto which a catalyst is loaded, has been used in treatment of harmful substances in an exhaust gas discharged from a car engine. Moreover, it is also known that a honeycomb structure formed by a sintered silicon carbide body has been used in purification of the exhaust gas (see, e.g., Patent Document 1).

When the exhaust gas is treated by the catalyst loaded onto the honeycomb structure, a temperature of the catalyst needs to be raised to a predetermined temperature. However, the catalyst temperature is low at the start of the engine, which has caused the problem that the exhaust gas is not sufficiently purified.

To solve the problem, a method has been investigated in which a heater made of a metal is disposed on an upstream side of a honeycomb structure onto which a catalyst is loaded, to raise a temperature of an exhaust gas (see, e.g., Patent Document 2).

Moreover, it has been disclosed that a honeycomb structure made of a conductive ceramic material and including both end portions provided with electrodes is used as a catalyst support with a heater (see, e.g., Patent Document 3).

PRIOR ART DOCUMENTS

Patent Documents

Patent Document 1: JP 4136319
Patent Document 2: JP 2931362
Patent Document 3: JP-A-8-141408

SUMMARY OF THE INVENTION

When the above-mentioned metal heater is mounted on a car and used, a power source for use in an electric system of the car is used in common, and, for example, the power source of a high voltage of 200 V is used. However, in the metal heater, an electric resistance is low. In consequence, when the above high-voltage power source is used, a current excessively flows. As a result, there has been the problem that a power source circuit is damaged sometimes.

Furthermore, when the heater is made of the metal, the catalyst is not easily loaded onto the heater even if the heater is processed into a honeycomb constitution. Therefore, it has been difficult to integrally dispose the heater and the catalyst.

Additionally, in a catalyst support with a heater in which electrodes are arranged in both end portions of a honeycomb structure made of a conductive ceramic material, the electrodes easily deteriorate, and a resistance value increases sometimes. This is because the electrodes are directly exposed to an exhaust gas, when the catalyst support with the heater is mounted on a car and used.

The present invention has been developed in view of the above-mentioned problems, and an object thereof is to provide a honeycomb structure which is a catalyst support and also functions as a heater when a voltage is applied thereto and which has a further excellent heat shock resistance.

According to the present invention, the following honeycomb structure is provided.

According to a first aspect of the present invention, a honeycomb structure includes: a tubular honeycomb structure part having porous partition walls with which a plurality of cells extending from one end surface to the other end surface are formed to become through channels of a fluid and an outer peripheral wall positioned on an outermost periphery is provided; and a pair of electrode parts arranged on a side surface of the honeycomb structure part, wherein an electrical resistivity of the honeycomb structure part is from 10 to 200 $\Omega$cm, each of the pair of electrode parts is formed into a band-like shape extending in a direction in which the cells of the honeycomb structure part extend, in a cross section perpendicular to the cell extending direction, the one electrode part in the pair of electrode parts is disposed opposite to the other electrode part in the pair of electrode parts via the center of the honeycomb structure part, and the electrode part has portions having a thickness of 0 to 70% of the maximum thickness of the electrode part.

According to a second aspect of the present invention, the honeycomb structure according to the above first aspect is provided, wherein the electrode part is provided with through holes.

According to a third aspect of the present invention, the honeycomb structure according to the above first or second aspects is provided, wherein the maximum thickness of the electrode part is from 0.025 to 3 mm.

According to a fourth aspect of the present invention, the honeycomb structure according to any one of the above first to third aspects is provided, wherein each of the pair of electrode parts is formed along a region between both end portions of the honeycomb structure part.

According to a fifth aspect of the present invention, the honeycomb structure according to any one of the above first to fourth aspects is provided, wherein an electrical resistivity of the electrode part is from 0.01 to 100 $\Omega$cm.

According to a sixth aspect of the present invention, the honeycomb structure according to any one of the above first to fifth aspects is provided, wherein a conductor having an electrical resistivity lower than that of the electrode part is disposed on the surface of the electrode part.

In the honeycomb structure of the present invention, the electrical resistivity of the honeycomb structure part is from 10 to 200 $\Omega$cm. Therefore, even when a current is allowed to flow by using a high-voltage power source, the current does not excessively flow, so that the honeycomb structure can suitably be used as a heater. Moreover, in the honeycomb structure of the present invention, each of the pair of electrode parts is formed into the band-like shape extending in the direction in which the cells of the honeycomb structure part extend. Furthermore, in the honeycomb structure of the present invention, in the cross section perpendicular to the cell extending direction, the one electrode part in the pair of electrode parts is disposed opposite to the other electrode part in the pair of electrode parts via the center of the honeycomb structure part. Therefore, it is possible to suppress a deviation of a temperature distribution when the voltage is applied. Furthermore, in the honeycomb structure of the present invention, "the electrode part has the portions having the thickness of 0 to 70% of the maximum thickness of the electrode part", and hence rigidity of the electrode part decreases. In consequence, it is possible to suppress generation of a large stress in the honeycomb structure part, even when a rapid temperature change takes place in a case where the honeycomb structure is mounted on an exhaust system of an internal combustion engine and used.

DETAILED DESCRIPTION OF THE INVENTION

Hereinafter, a mode for carrying out the present invention will be described, but it should be understood that the present invention is not limited to the following embodiments and that modifications, improvements and the like suitably added to the following embodiments on the basis of ordinary knowledge of a person skilled in the art without departing from the gist of the present invention are also included in the scope of the present invention.

Figure 1:
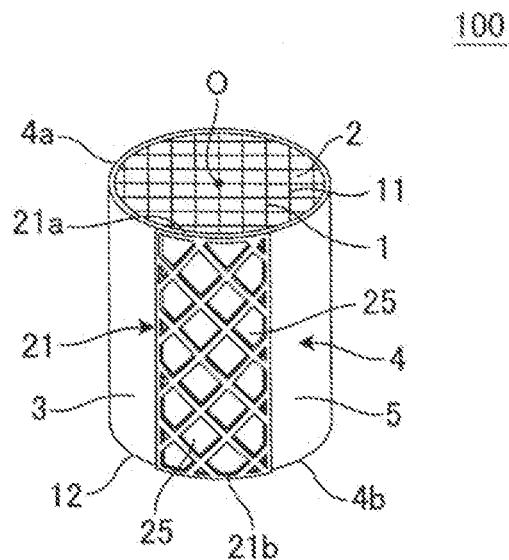
FIG. 1 is a perspective view schematically showing one embodiment of a honeycomb structure of the present invention.
Figure 2:
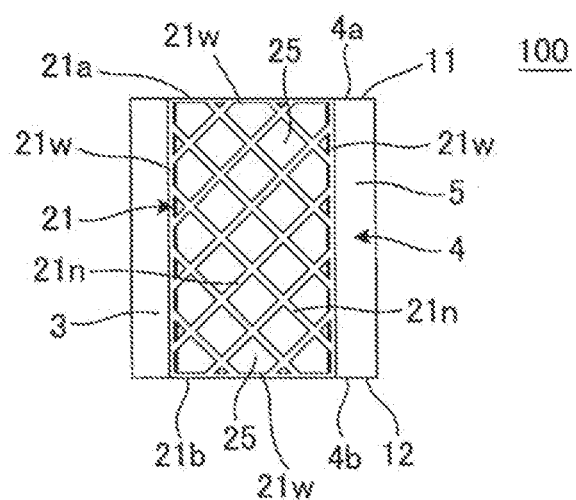
FIG. 2 is a front view schematically showing the one embodiment of the honeycomb structure of the present invention.
Figure 3:
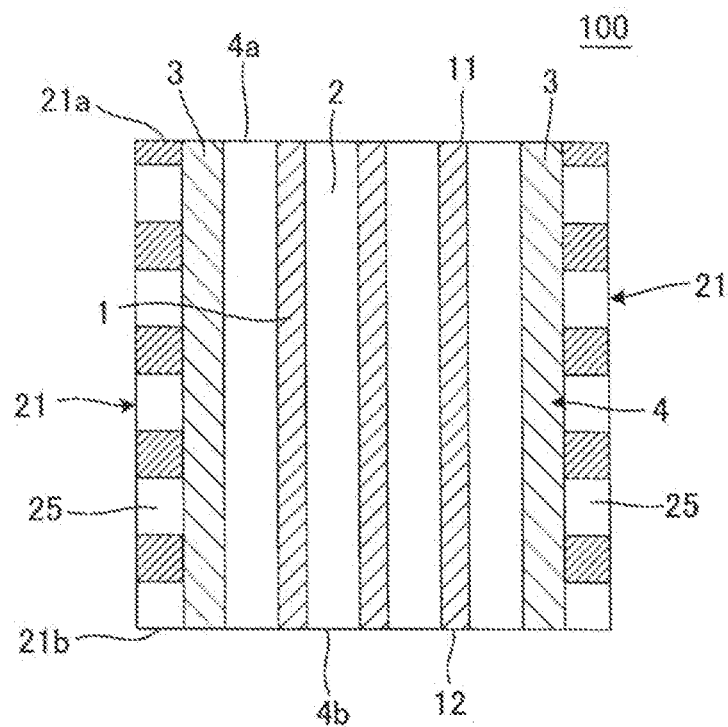
FIG. 3 is a schematic view showing a cross section of the one embodiment of the honeycomb structure of the present invention which is parallel to a cell extending direction.
Figure 4:
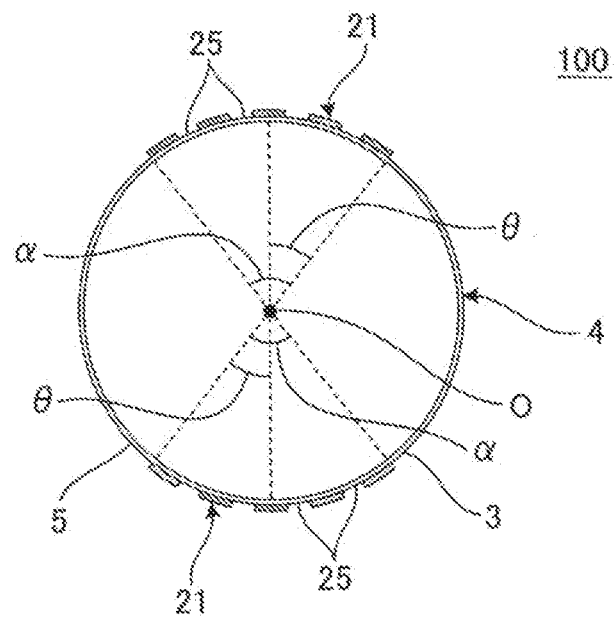
FIG. 4 is a schematic view showing a cross section of the one embodiment of the honeycomb structure of the present invention which is perpendicular to the cell extending direction.

[1] Honeycomb Structure:

One embodiment of a honeycomb structure of the present invention includes a tubular honeycomb structure part 4 having porous partition walls 1 and an outer peripheral wall 3 positioned on an outermost periphery, and a pair of electrode parts 21 and 21 arranged on a side surface 5 of the honeycomb structure part 4, as in a honeycomb structure 100 shown in FIG. 1 to FIG. 4. With the partition walls 1, a plurality of cells 2 "extending from one end surface 11 to the other end surface 12" are formed "to become through channels of a fluid". In the honeycomb structure 100, an electrical resistivity of the honeycomb structure part 4 is from 10 to 2000 Ωcm. Each of the pair of electrode parts 21 and 21 of the honeycomb structure 100 is formed into a band-like shape extending in a direction in which the cells 2 of the honeycomb structure part 4 extend. In a cross section of the honeycomb structure 100 which is perpendicular to the extending direction of the cells 2, the one electrode part 21 in the pair of electrode parts 21 and 21 is disposed opposite to the other electrode part 21 in the pair of electrode parts 21 and 21 via a center O of the honeycomb structure part 4. Furthermore, in the honeycomb structure 100, the electrode part 21 has portions (thin portions 25) having a thickness of 0 to 70% of the maximum thickness of the electrode part 21. FIG. 1 is a perspective view schematically showing one embodiment of the honeycomb structure of the present invention. FIG. 2 is a front view schematically showing the one embodiment of the honeycomb structure of the present invention. FIG. 3 is a schematic view showing a cross section of the one embodiment of the honeycomb structure of the present invention which is parallel to the cell extending direction. FIG. 4 is a schematic view showing a cross section of the one embodiment of the honeycomb structure of the present invention which is perpendicular to the cell extending direction. It is to be noted that in FIG. 4, the partition walls are omitted.

As described above, in the honeycomb structure 100 of the present embodiment, the electrical resistivity of the honeycomb structure part 4 is from 10 to 200 Ωcm. Therefore, even when a current is allowed to flow by use of a high-voltage power source, the current does not excessively flow, so that the honeycomb structure can suitably be used as a heater. Moreover, each of the pair of electrode parts 21 and 21 is formed into the band-like shape, and the one electrode part 21 is disposed opposite to the other electrode part 21 via the center of the honeycomb structure part 4. Therefore, it is possible to suppress a deviation of a temperature distribution of the honeycomb structure part 4 when a voltage is applied between the pair of electrode parts 21 and 21. Furthermore, in the honeycomb structure 100, "the electrode part 21 has the portions having the thickness of 0 to 70% of the maximum thickness of the electrode part 21", and hence a difference between rigidity of the electrode part 21 and rigidity of the outer peripheral wall 3 decreases. As a result, it is possible to suppress generation of a large stress in the honeycomb structure part 4, even when rapid heating and rapid cooling take place in a case where the honeycomb structure is mounted on a car and used. It is to be noted that the pair of electrode parts 21 and 21 are the electrodes which allow the current to flow through the honeycomb structure part 4 (the partition walls 1 and the outer peripheral wall 3).

It is to be noted that "in the cross section perpendicular to the extending direction of the cells 2, the one electrode part 21 in the pair of electrode parts 21 and 21 is disposed opposite to the other electrode part 21 in the pair of electrode parts 21 and 21 via the center O of the honeycomb structure part 4" is defined as follows. That is, it is meant that the pair of electrode parts 21 and 21 are arranged in the honeycomb structure part 4 in such a positional relation that an angle $\beta$ formed between a line segment (A) and a line segment (B) is in a range of 170 to 190° in the cross section perpendicular to the extending direction of the cells 2. The above line segment (A) is a line segment connecting a center point (the center point in "a peripheral direction of the honeycomb structure part 4") of the one electrode part 21 to the center O of the honeycomb structure part 4. The above line segment (B) is a line segment connecting a center point of the other electrode part 21 (the center point in "the peripheral direction of the honeycomb structure part 4") to the center O of the honeycomb structure part 4. The angle $\beta$ is an angle around "the center O".

In the honeycomb structure 100 of the present embodiment, a material of the partition walls 1 and the outer peripheral wall 3 preferably contains a silicon-silicon carbide composite material or a silicon carbide material as a main component, and the material is further preferably the silicon-silicon carbide composite material or the silicon carbide material. When "the material of the partition walls 1 and the outer peripheral wall 3 contains the silicon-silicon carbide composite material or the silicon carbide material as the main component", it is meant that the partition walls 1 and the outer peripheral wall 3 contain 90 mass % or more of the silicon-silicon carbide composite material or the silicon carbide material in the whole material. By the use of such a material, the electrical resistivity of the honeycomb structure part can be from 10 to 200 $\Omega$cm. Here, the silicon-silicon carbide composite material contains silicon carbide particles as aggregates, and silicon as a binding agent to bind the silicon carbide particles. The plurality of silicon carbide particles are preferably bound by silicon so as to form pores among the silicon carbide particles. Moreover, the silicon carbide material is obtained by mutually sintering the silicon carbide particles. The electrical resistivity of the honeycomb structure part is a value at 400° C.

As shown in FIG. 1 to FIG. 4, in the honeycomb structure 100 of the present embodiment, the side surface 5 of the honeycomb structure part 4 is provided with the pair of electrode parts 21 and 21. In the honeycomb structure 100 of the present embodiment, the voltage is applied between the pair of electrode parts 21 and 21, thereby generating heat. The voltage to be applied is preferably from 12 to 900 V, and further preferably from 64 to 600 V.

As shown in FIG. 1 to FIG. 4, in the honeycomb structure 100 of the present embodiment, (i) each of the pair of electrode parts 21 and 21 is formed into the band-like shape extending in the direction in which the cells 2 of the honeycomb structure part 4 extend. Moreover, (ii) in the cross section perpendicular to the extending direction of the cells 2, the one electrode part 21 in the pair of electrode parts 21 and 21 is disposed opposite to the other electrode part 21 in the pair of electrode parts 21 and 21 via the center O of the honeycomb structure part 4. Further in the honeycomb structure 100 of the present embodiment, 0.5 time a center angle $\alpha$ is preferably from 15 to 65°, further preferably from 20 to 65°, and especially preferably from 30 to 60°. The center angle $\alpha$ is a center angle of each of the electrode parts 21 and 21 in the cross section perpendicular to the extending direction of the cells 2. 0.5 time the center angle $\alpha$ is an angle $\theta$ of 0.5 time the center angle $\alpha$. Consequently, further in addition to the above (i) and the above (ii), the angle $\theta$ of 0.5 time the center angle $\alpha$ of each of the electrode parts 21 and 21 is from 15 to 65° in the cross section perpendicular to the extending direction of the cells 2. According to such a constitution, it is possible to more effectively suppress a deviation of the current flowing through the honeycomb structure part 4 when the voltage is applied between the pair of electrode parts 21 and 21. In consequence, a deviation of the heat generation in the honeycomb structure part 4 can be suppressed. As shown in FIG. 4, "the center angle $\alpha$ of the electrode part 21" is an angle formed between two line segments connecting both ends of the electrode part 21 to the center O of the honeycomb structure part 4 in the cross section perpendicular to the extending direction of the cells 2. The above "angle formed between the two line segments" is an inner angle of a portion of the center O in a shape (e.g., a fan shape) formed by the electrode part 21, a line segment (a) and a line segment (b) in the cross section perpendicular to the extending direction of the cells 2. The above line segment (a) is a line segment connecting one end portion of the electrode part 21 to the center O. The above line segment (b) is a line segment connecting the other end portion of the electrode part 21 to the center O.

Moreover, "the angle $\theta$ of 0.5 time the center angle $\alpha$" of the one electrode part 21 is preferably a size of 0.8 to 1.2 time "the angle $\theta$ of 0.5 time the center angle $\alpha$" of the other electrode part 21, and is further preferably a size of 1.0 time (the same size). In consequence, it is possible to suppress the deviation of the current flowing through the honeycomb structure part 4, when the voltage is applied between the pair of electrode parts 21 and 21. As a result, it is possible to suppress the deviation of the heat generation in the honeycomb structure part 4.

The electrode part has portions having the thickness of 0 to 70% of the maximum thickness of this electrode part, and preferably has portions having a thickness of at least 0%. That is, the electrode part is preferably provided with through holes. With the result that the electrode part has the above portions, it is possible to suppress the generation of the large stress in the honeycomb structure part, even when the rapid heating and rapid cooling take place in the case where the honeycomb structure is mounted on the car and used. Therefore, the honeycomb structure of the present embodiment has an excellent heat shock resistance. There is not any special restriction on a shape of an open frontal area of each of the through holes of the electrode part, and an open frontal area shape such as a triangular shape, a quadrangular shape, a hexagonal shape, an octagonal shape, a round shape or an elliptic shape may be used. In a polygonal shape, each corner portion is preferably formed into a curved shape. In other words, each corner portion of each of the through holes of the electrode part is preferably chamfered into a curved shape. Moreover, an open area can be from 0.01 to 100 mm$^2$.

Figure 5:
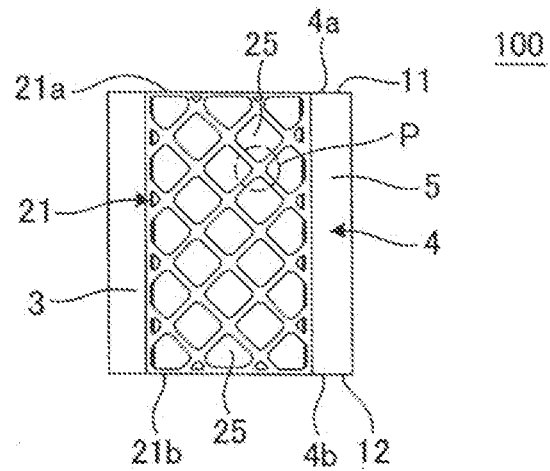
FIG. 5 is a front view schematically showing another embodiment of the honeycomb structure of the present invention.
Figure 6:
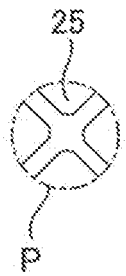
FIG. 6 is an enlarged schematic view of a region P shown in FIG. 5.

FIG. 5 is a front view schematically showing another embodiment of the honeycomb structure of the present invention. FIG. 5 shows an example where the open frontal area shape of each of the through holes (the thin portions 25) of the electrode part 21 is a quadrangular shape including curved corner portions. When the open frontal area shape of the through hole 25 of the electrode part 21 is such a shape, the stress generated in the electrode part 21 decreases as compared with a case where the shape of the open frontal area is a quadrangular shape including corner portions (the corner portions are not curved). It is to be noted that FIG. 6 is an enlarged schematic view of a region P shown in FIG. 5.

A value (S/U) of a ratio between an area S and a total U of an area T and the area S is preferably from 0.1 to 0.8, and further preferably from 0.2 to 0.7. In the above range of the above ratio value, the rigidity of the electrode part decreases. Therefore, there is the advantage that the stress generated in the honeycomb structure decreases. When the above ratio value is smaller than 0.1, a resistance of the electrode part increases, and hence an effect of more evenly allowing the current to flow through the whole honeycomb structure part when the voltage is applied deteriorates (the effect cannot sufficiently be obtained) sometimes. On the other hand, when the ratio value is in excess of 0.8, the rigidity of the electrode part increases, and hence an effect of further enhancing the heat shock resistance of the honeycomb structure deteriorates (the effect cannot sufficiently be obtained) sometimes. The area S and the area T can be calculated by image processing of the surface of the electrode part, or the like. The area S is an area of a portion having a thickness of 100% of the maximum thickness of the electrode part (i.e., the same thickness as the maximum thickness), in a plan view of the electrode part. The area T is an area of a portion having a thickness of 0 to 70% of the maximum thickness.

It is to be noted that "the portions having the thickness of 0 to 70% of the maximum thickness of the electrode part" can be defined as follows. That is, each of the portions is provided with a space constituted of at least one of the through hole and a dent, thereby decreasing the thickness of the electrode part as compared with the maximum thickness of the electrode part (including a case where the portion has no thickness).

Figure 7:
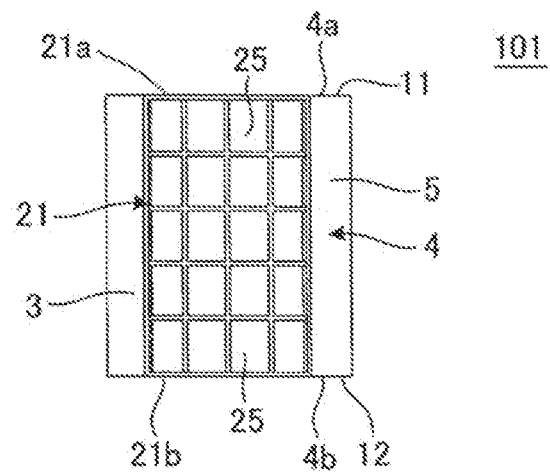
FIG. 7 is a front view schematically showing still another embodiment of the honeycomb structure of the present invention.

In the electrode parts of the honeycomb structure of the present embodiment, there is not any special restriction on an outer peripheral shape, a forming position and the like of the above portions, as long as each of the electrode parts has the portions having the thickness of 0 to 70% of the maximum thickness of the electrode part. Examples of the outer peripheral shape of each of the portions having the thickness of 0 to 70% of the maximum thickness of the electrode part include a triangular shape, a quadrangular shape, a round shape, an elliptic shape, and a polygonal shape including curved corner portions (or corner portions chamfered into a curved shape). Moreover, when the electrode part has a plurality of portions having the thickness of 0 to 70% of the maximum thickness of the electrode part, the portions may be formed to be orderly arranged or may irregularly be formed. For example, the electrode part 21 of the honeycomb structure 100 shown in FIG. 1 to FIG. 4 is an example where the through holes which are "the portions having the thickness of 0 to 70% of the maximum thickness of the electrode part" and having a quadrangular outer peripheral shape are formed to be orderly arranged as squares. That is, the honeycomb structure 100 shown in FIG. 1 to FIG. 4 is an example provided with the mesh-like electrode parts 21. It is to be noted that each of the mesh-like electrode parts 21 may have a shape in which an outer peripheral portion is eliminated. That is, the mesh-like electrode part may have a mesh-like shape which is not provided with an outer peripheral edge 21w of the electrode part 21 shown in FIG. 2. In other words, the mesh-like electrode part may have a mesh-like shape constituted of a plurality of linear portions 21n formed to tilt in the cell extending direction of the honeycomb structure 100. Moreover, in the mesh-like electrode 21, portions having a thickness of 100% of the maximum thickness of the electrode part may vertically and laterally be formed as in a honeycomb structure 101 shown in FIG. 7. In other words, the mesh-like electrode part 21 may be formed in parallel with the cell extending direction of the honeycomb structure 101 and perpendicularly to the cell extending direction of the honeycomb structure 101. FIG. 7 is a front view schematically showing such another embodiment of the honeycomb structure of the present invention.

Figure 8:
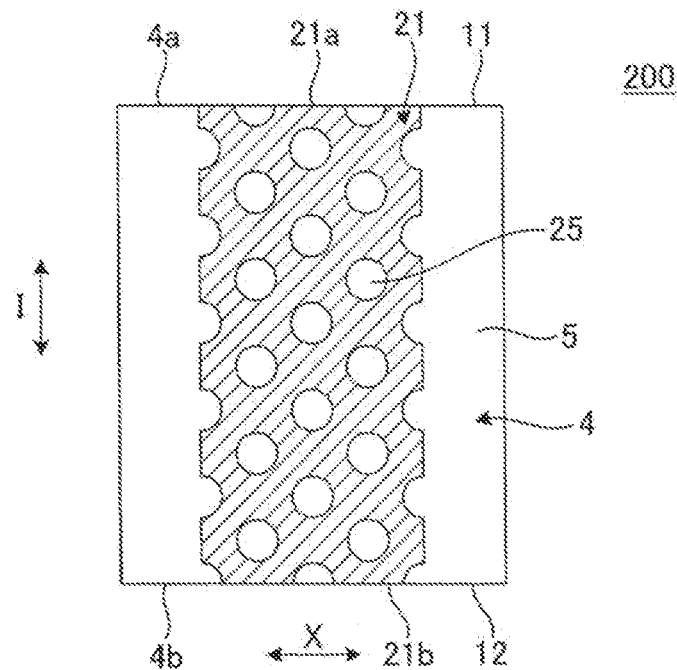
FIG. 8 is a front view schematically showing a further embodiment of the honeycomb structure of the present invention.
Figure 9:
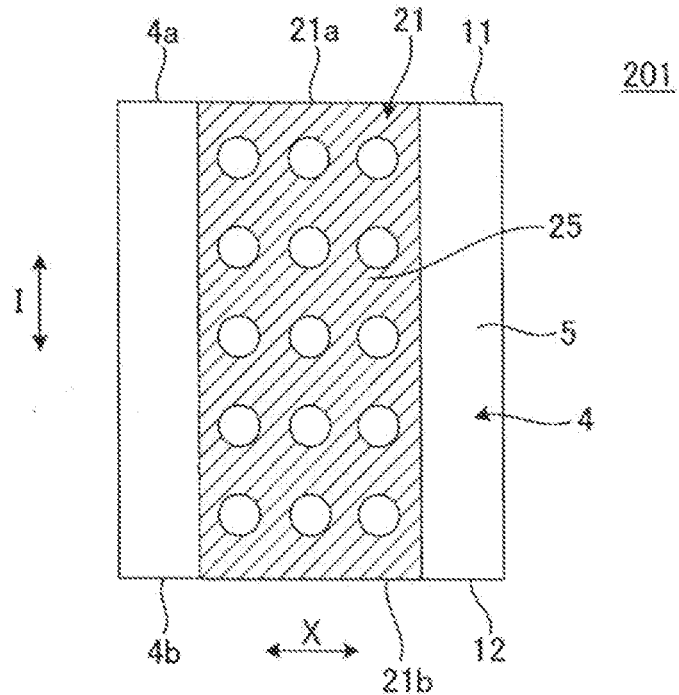
FIG. 9 is a front view schematically showing a further embodiment of the honeycomb structure of the present invention.

An electrode part 21 of a honeycomb structure 200 shown in FIG. 8 is an example where a plurality of through holes (thin portions 25) are formed to be orderly arranged in an extending direction I of cells 2 of the honeycomb structure 200, and formed in a plurality of rows in a peripheral direction X. In other words, the honeycomb structure 200 shown in FIG. 8 is an example where the electrode part 21 having a so-called punching plate-like shape is formed. The above through holes are through holes which are "portions having a thickness of 0 to 70% of the maximum thickness of the electrode part" and having a round outer peripheral shape. FIG. 8 is a front view schematically showing such a further embodiment of the honeycomb structure of the present invention. There is not any special restriction on the arrangement of the through holes (the thin portions 25), and through holes may vertically and laterally be arranged adjacent to one another as in a honeycomb structure 201 shown in FIG. 9. FIG. 9 is a front view schematically showing such a further embodiment of the honeycomb structure of the present invention.

Figure 10:
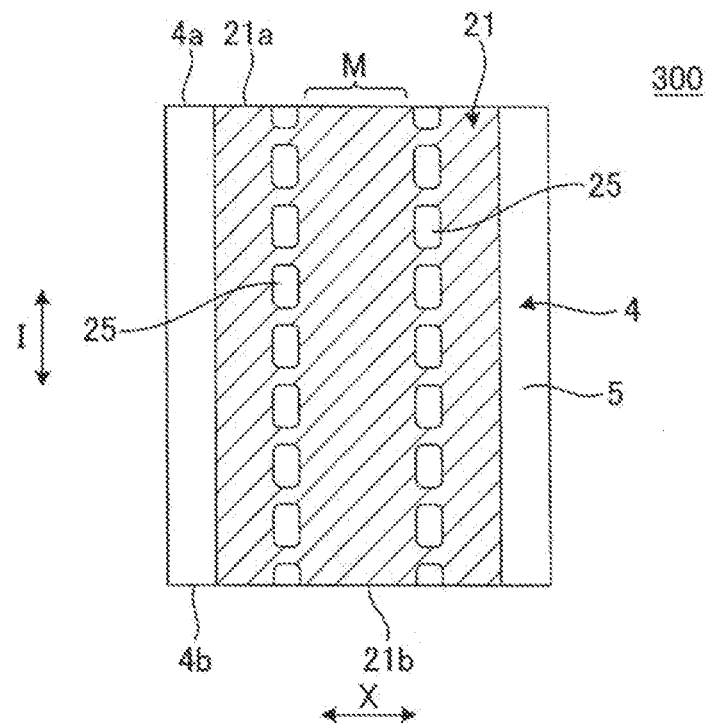
FIG. 10 is a front view schematically showing a further embodiment of the honeycomb structure of the present invention.
Figure 11:
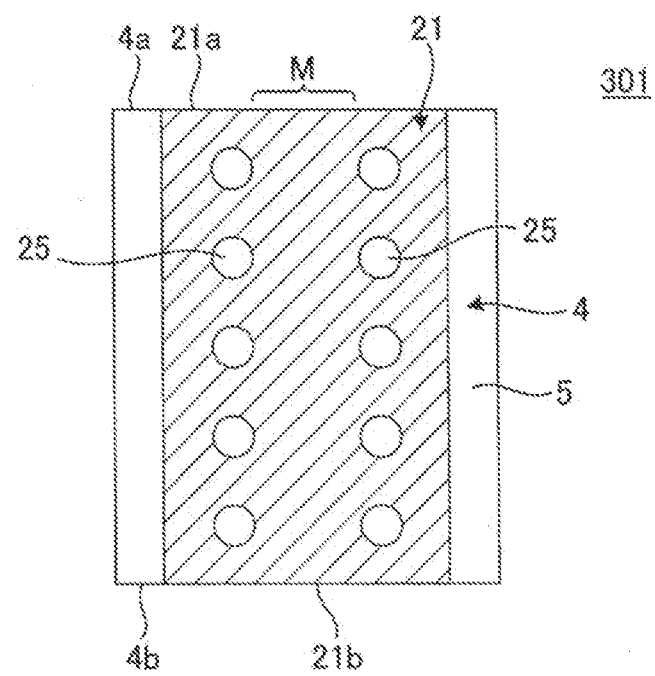
FIG. 11 is a front view schematically showing a further embodiment of the honeycomb structure of the present invention.

An electrode part 21 of a honeycomb structure 300 shown in FIG. 10 is an example where a plurality of through holes (thin portions 25) are formed to be orderly arranged in an extending direction I of cells 2 of the honeycomb structure 300, and formed in a plurality of rows in a peripheral direction X. The above through holes are "portions having a thickness of 0 to 70% of the maximum thickness of the electrode part" and having an elliptic outer peripheral shape. Moreover, the honeycomb structure 300 is an example where in a cross section perpendicular to the cell extending direction, "the portions having the thickness of 0 to 70% of the maximum thickness of the electrode part" are not formed in a region M positioned at the center of the electrode part 21. As described later, in the honeycomb structure 300, an electrode terminal projecting portion 22 (see FIG. 20) or a conductor 23 (see FIG. 23) can easily and suitably be disposed in the above "region M positioned at the center" of the electrode part 21. FIG. 10 is a front view schematically showing such a further embodiment of the honeycomb structure of the present invention. Moreover, FIG. 11 is a front view schematically showing a further embodiment of the honeycomb structure of the present invention. A honeycomb structure 301 shown in FIG. 11 is an example having an electrode part 21 provided with round through holes (thin portions 25), in place of elliptic through hole (thin portions 25).

Figure 12:
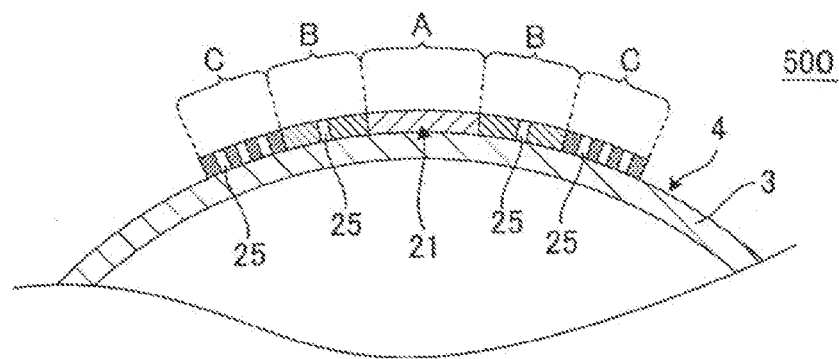
FIG. 12 is a front view showing schematically showing a further embodiment of the honeycomb structure of the present invention.
Figure 13:
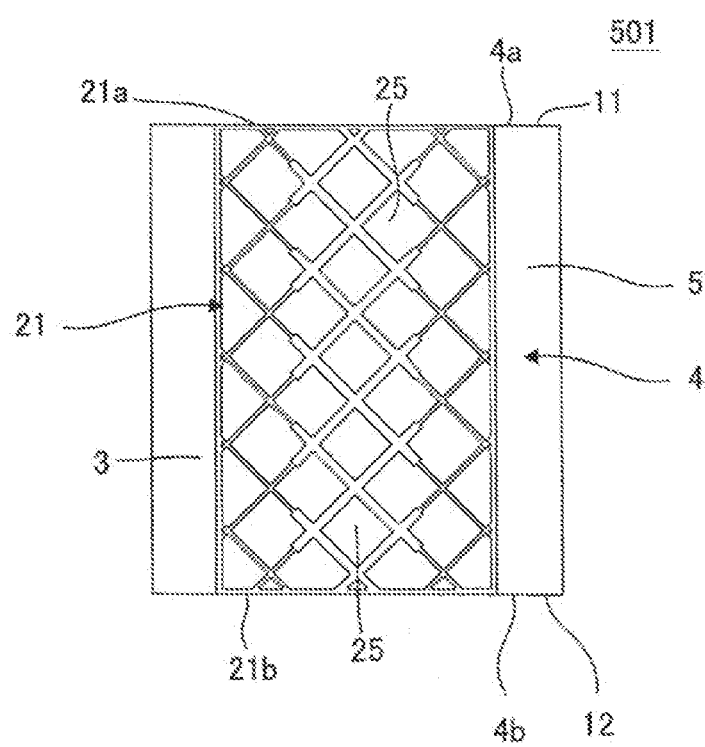
FIG. 13 is a front view schematically showing a further embodiment of the honeycomb structure of the present invention.

The honeycomb structure of the present invention is preferably provided with "portions (a)" which are "portions having a thickness of 0 to 70% of the maximum thickness of each of electrode parts" as in a honeycomb structure 500 shown in FIG. 12. That is, the electrode part has a plurality of regions, and in a cross section perpendicular to a cell extending direction, "the portions (a)" are preferably formed at a density which increases from the region positioned at the center toward the regions positioned on outer sides. "The plurality of regions" are a plurality of regions of the electrode part 21 which are arranged along an outer periphery of a honeycomb structure part 4 in the cross section perpendicular to the cell extending direction. In other words, "the plurality of regions" in FIG. 12 are a plurality of regions of a region A in the electrode part, regions B in the electrode part, and regions C in the electrode part. That is, the value (S/U) of the ratio between the area S and the total U of the area T and the area S preferably decreases from the region positioned at the center toward the regions positioned on the outer sides. The area S is an area of the portion having the thickness of 100% of the maximum thickness of the electrode part (i.e., the same thickness as the maximum thickness), in the plan view of the electrode part. The area T is an area of the portion having the thickness of 0 to 70% of the maximum thickness. Examples of the honeycomb structure having the electrode part in which "the portions having the thickness of 0 to 70% of the maximum thickness of the electrode part" are formed at a density which increases from the region positioned at the center toward the regions positioned on the outer sides include honeycomb structures 501, 502a and 502b shown in FIG. 13, FIG. 14A and FIG. 14B. The honeycomb structure 501 shown in FIG. 13 is an example having an electrode part in which "portions having a thickness of 0 to 70% of the maximum thickness of the electrode part" are formed at a density which increases from a region positioned at the center toward regions positioned on outer sides as in the mesh-like electrode part shown in FIG. 1. Moreover, the honeycomb structures 502a and 502b shown in FIG. 14A and FIG. 14B are examples each having an electrode part provided with through holes (thin portions 25) having an open area which increases from a region positioned at the center toward regions positioned on outer sides.

Figure 14A:
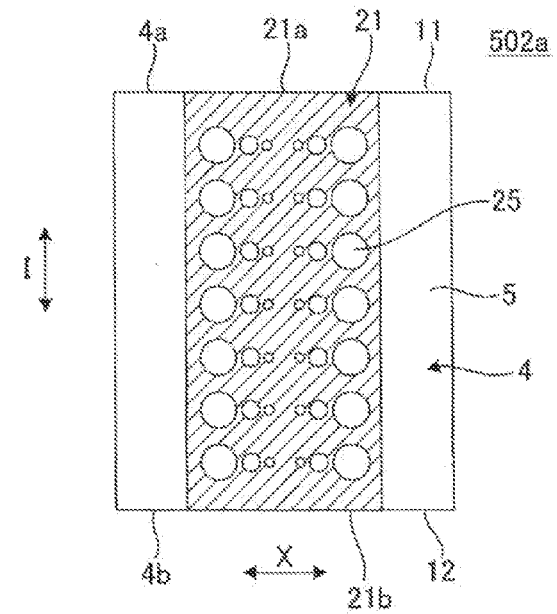
FIG. 14A is a front view schematically showing a further embodiment of the honeycomb structure of the present invention.
Figure 14B:
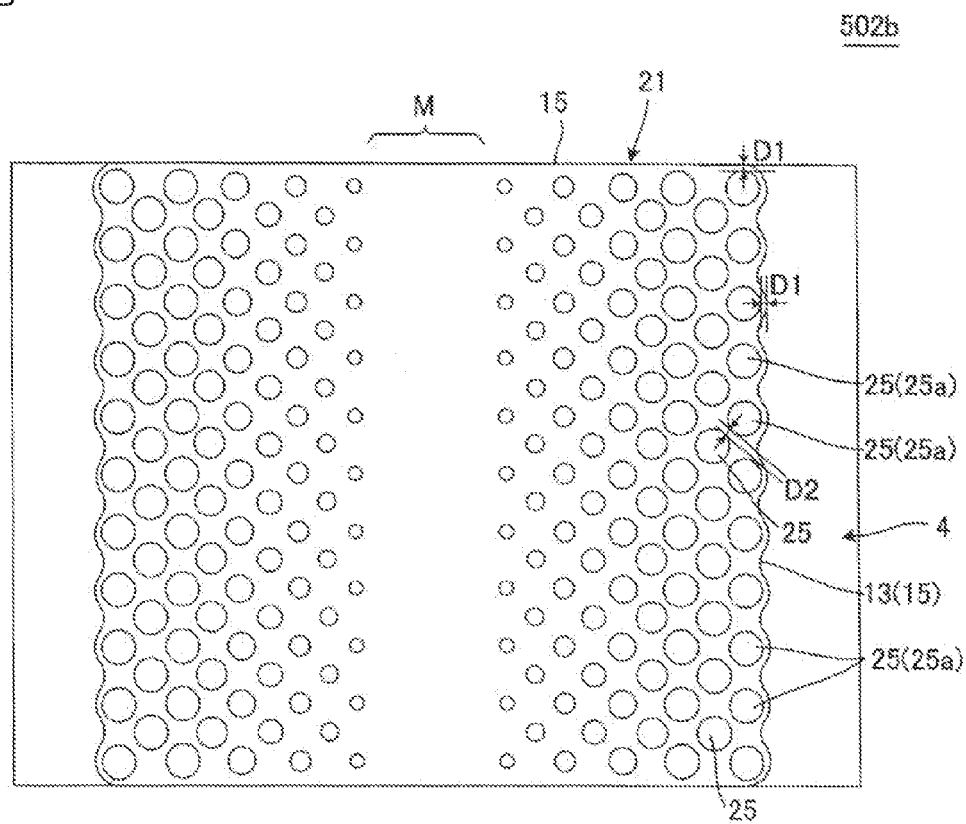
FIG. 14B is a front view schematically showing a further embodiment of the honeycomb structure of the present invention.

In each of the honeycomb structures shown in FIG. 14A and FIG. 14B, a distance between a side end edge side thin portion which is the thin portion positioned on the most side end edge side of an electrode part and an outer peripheral edge of the electrode part is preferably from 0.5 to 1.5 mm. Moreover, in each of the honeycomb structures shown in FIG. 14A and FIG. 14B, a distance between the above side end edge side thin portion and a thin portion closest to the above side end edge side thin portion is preferably from 0.5 to 2 mm. In each of the honeycomb structures shown in FIG. 14A and FIG. 14B, thin portions further preferably are not formed in a region positioned at the center of an electrode part 21 in a cross section perpendicular to a cell extending direction. "The thin portions" are "portions having a thickness of 0 to 70% of the maximum thickness of the electrode part". "The honeycomb structures shown in FIG. 14A and FIG. 14B" are honeycomb structures each having an electrode part in which "portions having a thickness of 0 to 70% of the maximum thickness of the electrode part" are formed at a density which increases from a region positioned at the center toward regions positioned on outer sides. "The side end edge" is an end edge of a honeycomb structure part in a peripheral direction.

In the honeycomb structure 502b shown in FIG. 14B, a distance D1 between a through hole (a thin portion 25) positioned on the most side end edge 13 side and an outer peripheral edge 15 of the electrode part 21 is 1.0 mm. Moreover, in the honeycomb structure 502b shown in FIG. 14B, a distance D2 between a through hole (a side end edge side thin portion 25a) positioned on the most side end edge 13 side and a thin portion 25 closest to the side end edge side thin portion 25a is 1.25 mm. Furthermore, in the honeycomb structure 502b shown in FIG. 14B, thin portions 25 are not formed in a region M positioned at the center of the electrode part 21.

Figure 15:
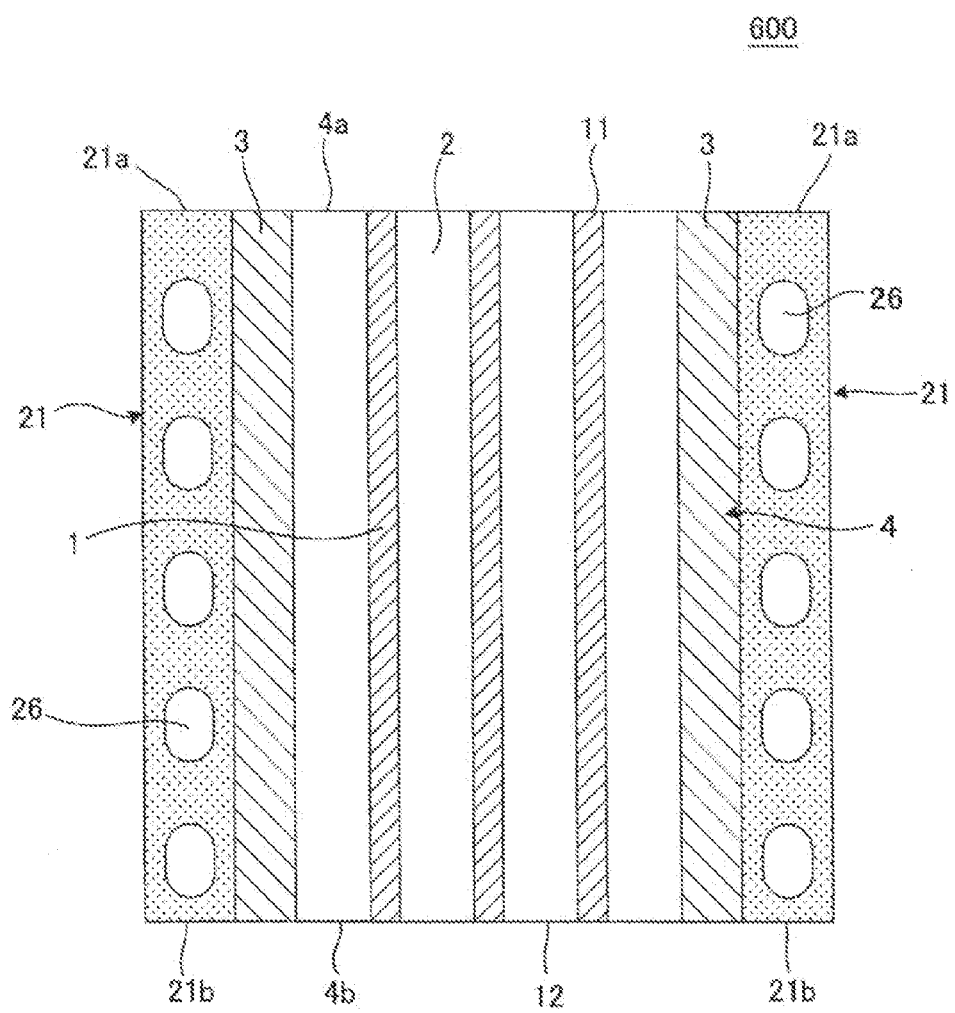
FIG. 15 is a schematic view showing a cross section of a further embodiment of the honeycomb structure of the present invention which is parallel to a cell extending direction.

As shown in FIG. 15, a honeycomb structure has cavities, and a total of thicknesses excluding the cavities may be a thickness of 0 to 70% of the maximum thickness of an electrode part. "The cavities" are cavities having a diameter of 100 μm or more in electrode parts 21 and 21 (hereinafter referred to simply as "the cavities" sometimes). "The thickness excluding the cavities" is a length obtained by excluding portions occupied by the cavities from the thickness of the electrode part. A honeycomb structure 600 shown in FIG. 15 is an example where a plurality of cavities 26 having a diameter of 100 μm or more are formed in a pair of electrode parts 21 and 21. There is not any special restriction on the shape, the number and the like of the cavities 26.

Figure 16:
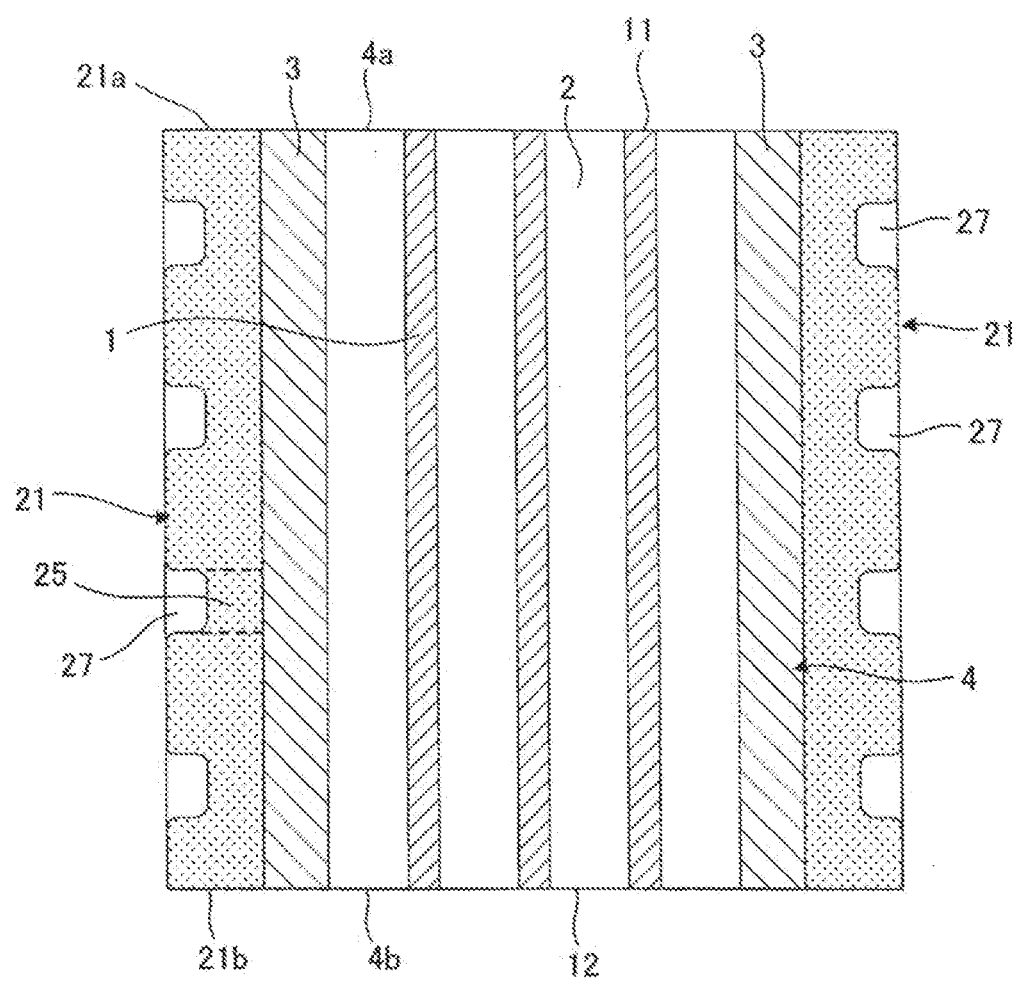
FIG. 16 is a schematic view showing a part of a cross section of a further embodiment of the honeycomb structure of the present invention which is perpendicular to a cell extending direction.

A honeycomb structure 601 shown in FIG. 16 is an example where a plurality of dents 27 are formed in the surfaces of a pair of electrode parts 21 and 21. That is, the pair of electrode parts 21 and 21 of the honeycomb structure 601 shown in FIG. 16 are provided with, for example, the dents 27 and accordingly have thin portions 25. There is not any restriction on a shape of an open frontal area of each of the dents 27, and the open frontal area shape can be a triangular shape, a quadrangular shape, a hexagonal shape, an octagonal shape, a round shape, an elliptic shape, a polygonal shape including curved corner portions (or corner portions chamfered into a curved shape), or the like. Moreover, an open area can be from 0.01 to 100 mm$^2$. The thin portions do not need to have the same thickness in the whole electrode part. Furthermore, as shown in FIG. 12, the electrode part is preferably formed to be thickest in a region positioned at the center, formed to be thinner in regions positioned on outer sides, and formed to be thinnest in regions positioned at both ends in a cross section perpendicular to the cell extending direction. In the honeycomb structure 500 shown in FIG. 12, the electrode part 21 has a plurality of regions arranged along the outer periphery of the honeycomb structure part 4 in the cross section perpendicular to the cell extending direction. The "plurality of regions" are a plurality of regions constituted of the region A in the electrode part, the regions B in the electrode part, and the regions C in the electrode part. In this way, the electrode part is formed to be thinner in the regions positioned on the outer sides of the electrode part in the cross section perpendicular to the cell extending direction, so that it is possible to further decrease the deviation of the temperature distribution of the honeycomb structure part when the voltage is applied to the electrode part. When the electrode part has the plurality of regions, there is not any special restriction on the number of the regions, and the number is preferably from about two to four. It is to be noted that the electrode part may have a smooth shape having no stepped portion and having "a continuously changing thickness" in the cross section perpendicular to the cell extending direction.

Figure 17:
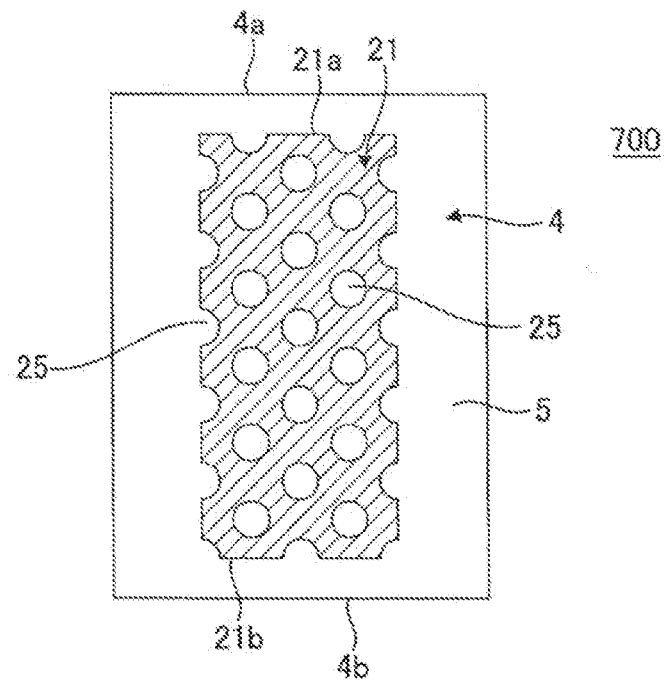
FIG. 17 is a front view schematically showing a further embodiment of the honeycomb structure of the present invention.

In the honeycomb structure of the present invention, there is not any special restriction on each of the electrode parts, as long as the electrode part is formed into the band-like shape extending in the direction in which the cells of the honeycomb structure part extend. For example, as shown in FIG. 3, each of the pair of electrode parts 21 and 21 may be formed along a region between both end portions of the honeycomb structure part 4 (from one end portion 4a to the other end portion 4b). That is, one end portion 21a and the other end portion 21b of each of the pair of electrode parts 21 and 21 may be formed along the one end portion 4a and the other end portion 4b of the honeycomb structure part 4, respectively. As "the one end portion 4a" is disposed away from "the one end portion 21a of the electrode part 21", "the other end portion 4b" may be disposed away from "the other end portion 21b of the electrode part 21", as in a honeycomb structure 700 shown in FIG. 17. The one end portion 4a is the one end portion 4a of the honeycomb structure part 4 in the extending direction of the cells 2. The other end portion 4b is the other end portion 4b of the honeycomb structure part 4 in the extending direction of the cells 2. Also in such cases, the electrode part 21 is preferably formed from the one end portion 4a to the other end portion 4b of the honeycomb structure part 4 in the cross section parallel to the extending direction of the cells 2. When the electrode parts are formed in this manner and when the voltage is applied to the honeycomb structure part 4, the heat can evenly be generated in the honeycomb structure part 4.

Moreover, an outer peripheral shape of each of the band-like electrode parts can be a rectangular shape including at least one curved corner portion, or a rectangular shape including at least one linearly chamfered corner portion. When "at least one corner portion of the rectangular shape has a curved shape", the heat shock resistance of the honeycomb structure can further be enhanced. When each of the corner portions of the electrode part has a right angle, there is a tendency to relatively increase a stress in the vicinity of "each of the corner portions of the electrode part" in the honeycomb structure part as compared with the other portions. In consequence, when the corner portion of the electrode part is curved, it is possible to further decrease the stress in the vicinity of "the corner portion of the electrode part" in the honeycomb structure part. The curved corner portion preferably has a circular shape. It is to be noted that when "at least one corner portion of the rectangular shape has a linearly chamfered shape", it is possible to obtain an effect similar to an effect obtained in a case where "the outer peripheral shape of the electrode part 21 is the rectangular shape including at least one curved corner portion". The curved corner portion can achieve the higher effect. Moreover, "band-like" in the present description can be referred to as sheet-like or film-like. That is, "the electrode part" in the present description does not include an outward projecting portion such as "an electrode terminal projecting portion" of the present description.

In the honeycomb structure of the present invention, the maximum thickness of each of the electrode parts is preferably from 0.025 to 3 mm, further preferably from 0.025 to 0.7 mm, and especially preferably from 0.05 to 0.5 mm. In such a range, the heat can evenly be generated. When the maximum thickness of the electrode part is smaller than 0.025 mm, the resistance of the electrode part increases, and hence the effect of more evenly allowing the current to flow through the whole honeycomb structure part when the voltage is applied (i.e., the effect of evenly generating the heat) deteriorates sometimes. On the other hand, when the maximum thickness is in excess of 3 mm, the honeycomb structure is damaged sometimes at canning.

A thickness of the outer peripheral wall 3 constituting the outermost periphery of the honeycomb structure part 4 is preferably from 0.1 to 1 mm, further preferably from 0.2 to 0.8 mm, and especially preferably from 0.2 to 0.5 mm. When the thickness is smaller than 0.1 mm, a strength of the honeycomb structure 100 (the honeycomb structure part 4) deteriorates sometimes. When the thickness is larger than 1 mm, an area of each of the partition walls onto which a catalyst is loaded decreases sometimes.

In the honeycomb structure of the present embodiment, a total of heat capacities of the pair of electrode parts is preferably from 2 to 150% of a heat capacity of the whole outer peripheral wall. In such a range, an amount of the heat to be accumulated in the electrode parts decreases, and the heat shock resistance of the honeycomb structure enhances. Therefore, it is possible to suppress the generation of the large stress in the honeycomb structure part, even when a rapid temperature change takes place in a case where the honeycomb structure is mounted on an exhaust system of an internal combustion engine and used. The total of the heat capacities of the pair of electrode parts is further preferably not more than the heat capacity of the whole outer peripheral wall (i.e., from 2 to 100%), and is especially preferably smaller than the heat capacity of the whole outer peripheral wall. In consequence, the amount of the heat to be accumulated in the electrode parts further decreases, and the heat shock resistance of the honeycomb structure further enhances. Therefore, it is possible to further suppress the generation of the large stress in the honeycomb structure part, even when the rapid temperature change takes place in the case where the honeycomb structure is mounted on the exhaust system of then internal combustion engine and used. The total of the heat capacities of the pair of electrode parts is a value obtained by a heat capacity calculating method in which a porosity, a specific gravity of the material and specific heat are taken into consideration on the basis of a volume of each of the electrode parts. The above "volume of the electrode part" is a volume of each of the electrode parts which is calculated by using an average thickness and electrode angle (the center angle α in FIG. 4) of the electrode part which are measured by an optical microscope. The heat capacity of the whole outer peripheral wall is a value obtained by the heat capacity calculating method in which the porosity, the specific gravity of the material and the specific heat are taken into consideration on the basis of a volume of the outer peripheral wall. The above "volume of the outer peripheral wall" is a volume of the outer peripheral wall which is calculated by using an average thickness of the outer peripheral wall which is measured by the optical microscope. It is to be noted that in the present description, an area of a portion where the electrode part comes in contact with the side surface of the honeycomb structure part is "the contact area of the electrode part". Moreover, a cylinder which is coaxial with the honeycomb structure part and divides the electrode part is presumed, and a dividing surface of the electrode part divided by the cylinder is a virtual dividing surface. Furthermore, an area of this virtual dividing surface is "the virtual dividing area". When a boundary between the band-like electrode part and an outward projecting portion such as "the electrode terminal projecting portion" described later is not clear, "the electrode part" is a part where the above "virtual dividing area" is 90% or more of the above "contact area of the electrode part", in the calculation of "the heat capacity of the electrode part" in the present description. That is, in the above case, a part where the above "virtual dividing area" is smaller than 90% of the above "contact area of the electrode part" is not the electrode part, in the calculation of "the heat capacity of the electrode part" in the present description.

In the honeycomb structure of the present embodiment, when "the total of the heat capacities of the pair of electrode parts is smaller than the heat capacity of the whole outer peripheral wall", specifically, the total of the heat capacities of the pair of electrode parts is preferably from 2 to 80% of the heat capacity of the whole outer peripheral wall. A lower limit value is further preferably 9%, and especially preferably 15%. Moreover, an upper limit value is further preferably 75%, and especially preferably 50%. When the upper limit value is smaller than 2%, the effect of "further evenly allowing the current to flow through the whole honeycomb structure part when the voltage is applied" deteriorates sometimes. When the upper limit value is larger than 80%, an effect of improving the heat shock resistance decreases sometimes.

In the honeycomb structure of the present embodiment, the electrical resistivity of the electrode part 21 may be uniform, or partially vary. When the electrical resistivity of the electrode part 21 is uniform, the electrical resistivity of the electrode part 21 is preferably from 0.01 to 100 Ωcm, further preferably from 0.1 to 100 Ωcm, and especially preferably from 0.1 to 50 Ωcm. In such a range of the electrical resistivity of the electrode part 21, each of the pair of electrode parts 21 and 21 effectively performs a function of an electrode in a piping line through which a high-temperature exhaust gas flows. When the electrical resistivity of the electrode part 21 is smaller than 0.01 Ωcm, a temperature of the honeycomb structure part easily rises sometimes in the vicinities of both ends of the electrode part 21 in the cross section perpendicular to the cell extending direction. When the electrical resistivity of the electrode part 21 is larger than 100 Ωcm, the current does not easily flow, and the electrode part does not easily perform the function of the electrode sometimes. The electrical resistivity of the electrode part is a value at 400° C.

Figure 18:
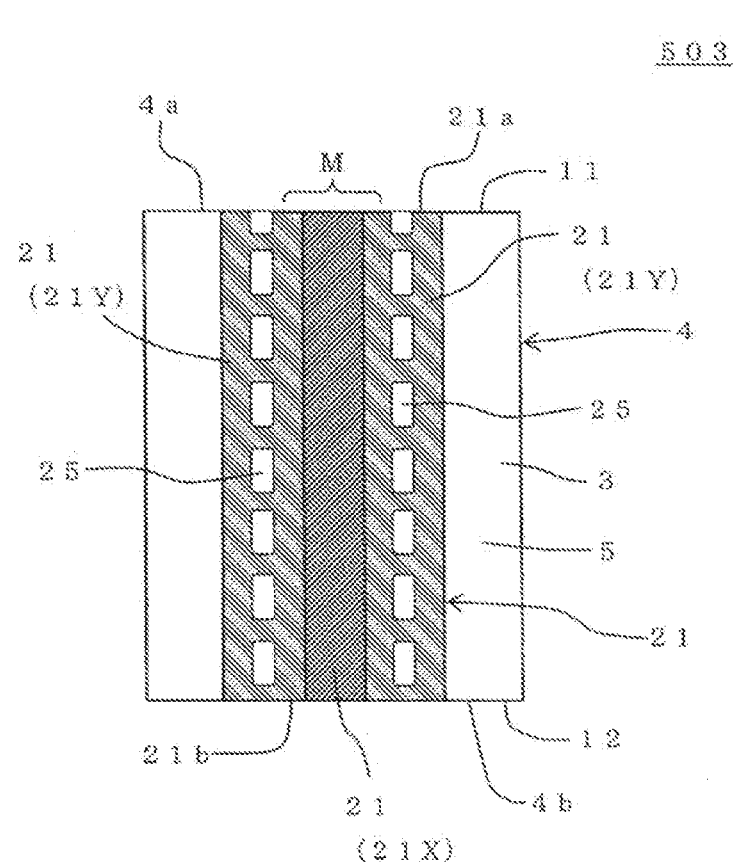
FIG. 18 is a front view schematically showing a further embodiment of the honeycomb structure of the present invention.
Figure 19:
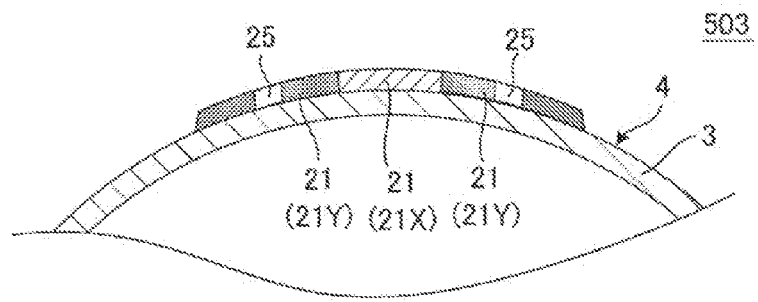
FIG. 19 is a schematic view showing a cross section of a further embodiment of the honeycomb structure of the present invention which is perpendicular to a cell extending direction.

When the electrical resistivity of the electrode part 21 partially varies, the electrode part 21 is constituted of a center portion 21x and extended portions 21Y and 21Y as in a honeycomb structure 503 shown in FIG. 18 and FIG. 19, and an electrical resistivity of the center portion 21X of the electrode part 21 is preferably smaller than an electrical resistivity of each of the extended portions 21Y and 21Y of the electrode part 21. The center portion 21X is a portion of the electrode part 21 in the peripheral direction, in the cross section perpendicular to the extending direction of the cells 2. The extended portions 21Y and 21Y are portions positioned on both sides of the center portion 21X in the peripheral direction, in the cross section perpendicular to the extending direction of the cells 2. In consequence, when the electrical resistivity of the center portion 21X of the electrode part 21 is smaller than the electrical resistivity of the extended portion 21Y of the electrode part 21 and when the voltage is applied to the center portion 21X of the electrode part 21, the current easily flows through the center portion 21X having a low electrical resistivity. Therefore, the deviation of the flow of the current in the cell extending direction of the honeycomb structure decreases. In consequence, it is possible to effectively suppress the deviation of the temperature distribution in the extending direction of the cells 2 of the honeycomb structure part 4. FIG. 18 is a front view schematically showing this further embodiment of the honeycomb structure of the present invention. FIG. 19 is a schematic view showing a cross section of the further embodiment of the honeycomb structure of the present invention which is perpendicular to the cell extending direction.

The electrical resistivity of the center portion 21X is preferably from 0.0001 to 70%, further preferably from 0.001 to 50%, and especially preferably from 0.001 to 10 of the electrical resistivity of each of the extended portions 21Y and 21Y. When the electrical resistivity is smaller than 0.0001, the flow of the current in an outer peripheral direction decreases in the cross section perpendicular to a central axis of the honeycomb structure part, and the deviation of the temperature distribution increases sometimes. When the electrical resistivity is larger than 70%, an effect of suppressing the deviation of the temperature distribution of the honeycomb structure 503 deteriorates sometimes.

Moreover, in the honeycomb structure of the present embodiment, a Young's modulus of the electrode part 21 is preferably from 2 to 50 GPa, further preferably from 3 to 45 GPa, and especially preferably from 3 to 35 GPa. In such a range of the Young's modulus of the electrode part 21, an isostatic strength of the electrode part 21 can be acquired, and cracks are not easily generated in the honeycomb structure part. When the Young's modulus of the electrode part 21 is smaller than 2 GPa, the isostatic strength of the electrode part 21 cannot be acquired sometimes. When the Young's modulus of the electrode part 21 is larger than 50 GPa, the rigidity enhances, and hence the cracks are easily generated in the honeycomb structure part sometimes. The Young's modulus may be uniform in the electrode part 21, or may partially vary. When the Young's modulus partially varies and the Young's modulus of a part of the electrode part is in the above range, the above effect can be acquired. When the Young's modulus of all of the electrode part is in the above range, the above effect further enhances.

The Young's modulus of each of the electrode parts is a value measured by a bending resonance method in conformity to JIS R1602. As a test piece for use in the measurement, there is used a test piece obtained by laminating a plurality of sheets made of an electrode part forming raw material to form the electrode part, to obtain a laminated body, then drying this laminated body, and cutting the laminated body into a size of 3 mm×4 mm×40 mm.

The electrode part 21 preferably contains silicon carbide particles and silicon as main components, and is further preferably made of the silicon carbide particles and silicon as raw materials, except usually contained impurities. Here, "the silicon carbide particles and silicon as the main components" means that a total mass of the silicon carbide particles and silicon is 90 mass % or more of a mass of the whole electrode part. In consequence, when the material of the honeycomb structure part is silicon carbide and when the electrode part 21 contains the silicon carbide particles and silicon as the main components, the components of the electrode part 21 are the same as or close to the components of the honeycomb structure part 4. That is, thermal expansion coefficients of the electrode part 21 and the honeycomb structure part 4 have the same value or close values. Moreover, the materials are the same material or close materials, and hence a joining strength between the electrode part 21 and the honeycomb structure part 4 increases. Therefore, even when a heat stress is applied to the honeycomb structure, peeling of the electrode part 21 from the honeycomb structure part 4 can be prevented, and a joining portion between the electrode part 21 and the honeycomb structure part 4 can be prevented from being damaged.

A porosity of the electrode part 21 is preferably from 30 to 80%, and further preferably from 30 to 70%. In such a range of the porosity of the electrode part 21, a suitable electrical resistivity can be obtained. When the porosity of the electrode part 21 is smaller than 30%, the electrode part is deformed sometimes at manufacturing. When the porosity of the electrode part 21 is larger than 80%, the electrical resistivity excessively increases sometimes. The porosity is a value measured by a mercury porosimeter.

An average pore diameter of the electrode part 21 preferably from 5 to 45 μm, and further preferably from 7 to 40 μm. In such a range of the average pore diameter of the electrode part 21, a suitable electrical resistivity can be obtained. When the average pore diameter of the electrode part 21 is smaller than 5 μm, the electrical resistivity excessively increases sometimes. When the average pore diameter of the electrode part 21 is larger than 40 μm, the electrode part 21 has a deteriorated strength and is easily damaged sometimes. The average pore diameter is a value measured by the mercury porosimeter.

When the main components of the electrode part 21 are the silicon carbide particles and silicon, an average particle diameter of the silicon carbide particles contained in the electrode part 21 is preferably from 10 to 70 μm, and further preferably from 10 to 60 μm. In such a range of the average particle diameter of the silicon carbide particles contained in the electrode part 21, the electrical resistivity of the electrode part 21 can be controlled in a range of 0.1 to 100 Ωcm. When the average pore diameter of the silicon carbide particles contained in the electrode part 21 is smaller than 10 μm, the electrical resistivity of the electrode part 21 excessively increases sometimes. When the average pore diameter of the silicon carbide particles contained in the electrode part 21 is larger than 70 μm, the electrode part 21 has a deteriorated strength and is easily damaged sometimes. The average particle diameter of the silicon carbide particles contained in the electrode part 21 is a value measured by a laser diffraction method.

A ratio of a mass of silicon contained in the electrode part 21 is preferably from 20 to 50 mass %, and further preferably from 20 to 40 mass %. "The ratio of the mass of silicon contained in the electrode part 21" is a ratio of the mass of silicon contained in the electrode part 21 to "a total of respective masses of the silicon carbide particles and silicon" contained in the electrode part 21. In such a range of the above "ratio of the mass of silicon contained in the electrode part 21", the electrical resistivity of the electrode part 21 can be controlled in a range of 0.1 to 100 Ωcm. When the above "ratio of the mass of silicon contained in the electrode part 21" is smaller than 20 mass %, the electrical resistivity excessively increases sometimes. On the other hand, when the above "ratio of the mass of silicon contained in the electrode part 21" is larger than 50 mass %, the electrode part is easily deformed sometimes at the manufacturing.

In the honeycomb structure 100 of the present embodiment, a partition wall thickness is from 50 to 260 μm, and preferably from 70 to 180 μm. In such a range of the partition wall thickness, a pressure loss can be prevented from being excessively increased, when a catalyst is loaded onto the honeycomb structure 100 which is a catalyst support and then the exhaust gas is allowed to flow. When the partition wall thickness is smaller than 50 μm, the strength of the honeycomb structure deteriorates sometimes. When the partition wall thickness is larger than 260 μm, the pressure loss increases sometimes in the case where the catalyst is loaded onto the honeycomb structure 100 which is the catalyst support and then the exhaust gas is allowed to flow.

In the honeycomb structure 100 of the present embodiment, a cell density is preferably from 40 to 150 cells/cm$^2$, and further preferably from 70 to 100 cells/cm$^2$. In such a range of the cell density, a purification performance of the catalyst can be enhanced in a state where the pressure loss at the flowing of the exhaust gas is decreased. When the cell density is smaller than 40 cells/cm$^2$, a catalyst loading area decreases sometimes. When the cell density is larger than 150 cells/cm$^2$, the pressure loss increases sometimes in the case where the catalyst is loaded onto the honeycomb structure 100 which is the catalyst support and then the exhaust gas is allowed to flow.

In the honeycomb structure 100 of the present embodiment, an average particle diameter of silicon carbide particles (aggregates) constituting the honeycomb structure part 4 is preferably from 3 to 50 μm, and further preferably from 3 to 40 μm. In such a range of the average particle diameter of the silicon carbide particles constituting the honeycomb structure part 4, the electrical resistivity of the honeycomb structure part 4 at 400° C. can be from 10 to 200 Ωcm. When the average particle diameter of the silicon carbide particles is smaller than 3 μm, the electrical resistivity of the honeycomb structure part 4 increases sometimes. When the average particle diameter of the silicon carbide particles is larger than 50 μm, the electrical resistivity of the honeycomb structure part 4 decreases sometimes. Furthermore, when the average particle diameter of the silicon carbide particles is larger than 50 μm, an extrusion forming die is clogged with a forming raw material sometimes at the extrusion forming of a formed honeycomb body. The average particle diameter of the silicon carbide particles is a value measured by the laser diffraction method.

In the honeycomb structure 100 of the present embodiment, the electrical resistivity of the honeycomb structure part 4 is from 10 to 200 Ωcm, and preferably from 40 to 100 Ωcm. When the electrical resistivity is smaller than 10 Ωcm, the current excessively flows sometimes, for example, in a case where the honeycomb structure 100 is energized by a power source of a high voltage of 200 V or more. It is to be noted that the voltage is not limited to 200 V. When the electrical resistivity is larger than 200 Ωcm, the current does not easily flow and the heat is not sufficiently generated sometimes, for example, in the case where the honeycomb structure 100 is energized by the power source of the high voltage of 200 V or more. It is to be noted that the voltage is not limited to 200 V. The electrical resistivity of the honeycomb structure part is a value measured by a four-terminal method. The electrical resistivity of the honeycomb structure part is a value at 400° C.

In the honeycomb structure 100 of the present embodiment, the electrical resistivity of the electrode part 21 is preferably lower than the electrical resistivity of the honeycomb structure part 4. Specifically, the electrical resistivity of the electrode part 21 is preferably 20% or less, and further preferably from 1 to 10% of the electrical resistivity of the honeycomb structure part 4. When the electrical resistivity of the electrode part 21 is 20% or less of the electrical resistivity of the honeycomb structure part 4, the electrode part 21 further effectively functions as the electrode.

In the honeycomb structure 100 of the present embodiment, when a material of the honeycomb structure part 4 is a silicon-silicon carbide composite material, "a mass of the silicon carbide particles" and "a mass of silicon" are preferably in the following relation. That is, a ratio of "the mass of silicon" to a total of "the mass of the silicon carbide particles" and "the mass of silicon" is preferably from 10 to 40 mass %, and further preferably from 15 to 35 mass %. When the ratio is smaller than 10 mass %, the strength of the honeycomb structure deteriorates sometimes. When the ratio is larger than 40 mass %, the shape cannot be retained sometimes at firing. The above "mass of the silicon carbide particles" is "the mass of the silicon carbide particles as the aggregates" contained in the honeycomb structure part 4. The above "mass of silicon" is "the mass of silicon as the binding agent" contained in the honeycomb structure part 4.

A porosity of each of the partition walls 1 of the honeycomb structure part 4 is preferably from 35 to 60%, and further preferably from 45 to 55%. When the porosity is smaller than 35%, the deformation at the firing enlarges sometimes. When the porosity is in excess of 60%, the strength of the honeycomb structure deteriorates sometimes. The porosity is a value measured by the mercury porosimeter.

An average pore diameter of the partition walls 1 of the honeycomb structure part 4 is preferably from 2 to 15 and further preferably from 4 to 8 μm. When the average pore diameter is smaller than 2 μm, the electrical resistivity excessively increases sometimes. When the average pore diameter is larger than 15 μm, the electrical resistivity excessively decreases sometimes. The average pore diameter is a value measured by the mercury porosimeter.

A shape of the cells 2 in the cross section of the honeycomb structure 100 of the present embodiment which is perpendicular to the extending direction of the cells 2 is preferably a quadrangular shape, a hexagonal shape, an octagonal shape, or a combination of these shapes. With such a cell shape, the pressure loss at the flowing of the exhaust gas through the honeycomb structure 100 decreases, to enhance the purification performance of the catalyst.

There is not any special restriction on a shape of the honeycomb structure 100 of the present embodiment. Examples of the shape include a tubular shape with a round bottom surface (a cylindrical shape), a tubular shape with an oval bottom surface, and a tubular shape with a polygonal bottom surface (a quadrangular shape, a pentangular shape, a hexagonal shape, a heptagonal shape, an octagonal shape, or the like). Moreover, as to a size of the honeycomb structure, an area of the bottom surface is preferably from 2000 to 20000 mm$^2$, and further preferably from 4000 to 10000 mm$^2$. Furthermore, a length of the honeycomb structure in a central axis direction is preferably from 50 to 200 mm, and further preferably from 75 to 150 mm.

An isostatic strength of the honeycomb structure 100 of the present embodiment is preferably 1 MPa or more, and further preferably 3 MPa or more. The isostatic strength preferably has a larger value. When a material, a constitution and the like of the honeycomb structure 100 are taken into consideration, an upper limit is about 6 MPa. When the isostatic strength is smaller than 1 MPa, the honeycomb structure is easily damaged sometimes during use of the honeycomb structure as the catalyst support or the like. The isostatic strength is a value measured under a hydrostatic pressure in water.

Figure 20:
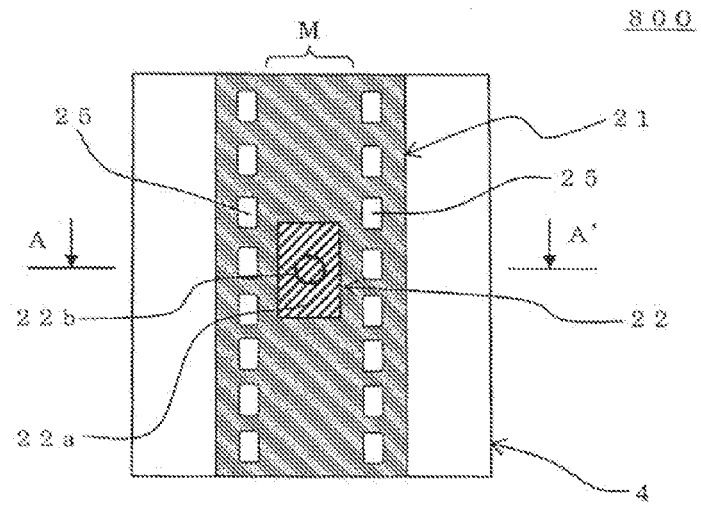
FIG. 20 is a front view schematically showing a further embodiment of the honeycomb structure of the present invention.
Figure 21:
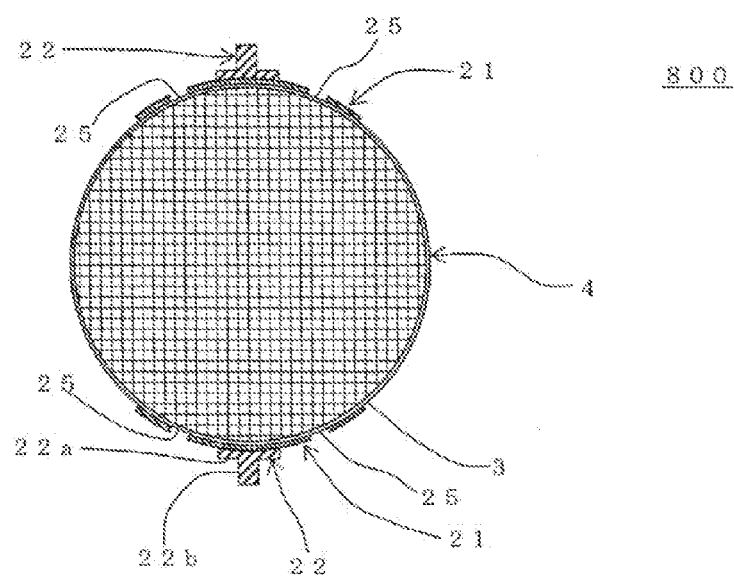
FIG. 21 is a schematic view showing a cross section taken along the line A-A' of FIG. 20.
Figure 22:
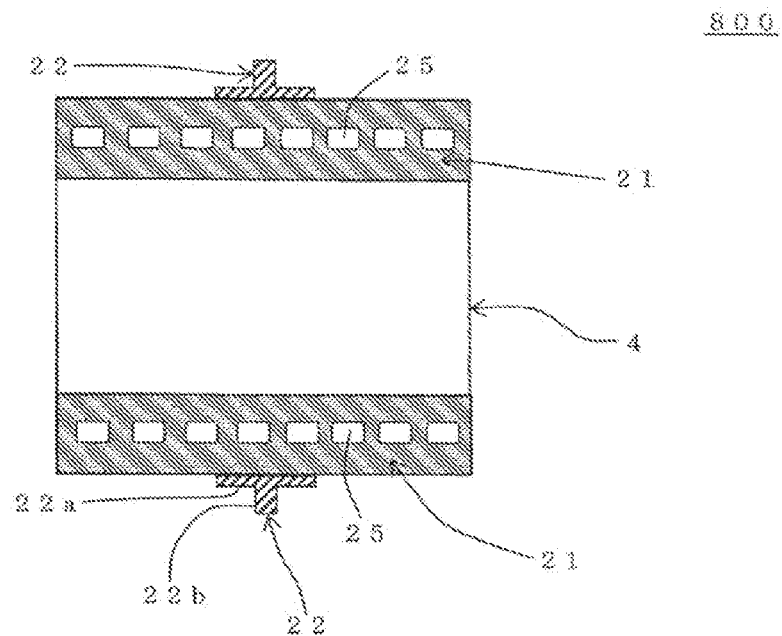
FIG. 22 is a side view schematically showing the embodiment of the honeycomb structure of the present invention.

[2] Honeycomb Structure:

Next, a further embodiment of the honeycomb structure of the present invention will be described. As shown in FIG. 20 to FIG. 22, in a honeycomb structure 800 of the present embodiment, electrode terminal projecting portions 22 to be connected to electric wires are arranged in the honeycomb structure 300 (see FIG. 10) of the above embodiment. In the honeycomb structure 800, the electrode terminal projecting portions 22 are arranged in center portions of respective electrode parts 21 and 21 in a cross section perpendicular to a cell extending direction, and in center portions of the respective electrode parts in the cell extending direction. "The center portion in the cross section perpendicular to the cell extending direction" is a center portion of a honeycomb structure part in a peripheral direction. The electrode terminal projecting portions 22 are portions to be connected to the wires from a power source so that a voltage is applied between the electrode parts 21 and 21. In this manner, the electrode terminal projecting portions 22 are arranged, and hence when the voltage is applied between the electrode parts, a deviation of a temperature distribution of the honeycomb structure part can further be decreased. FIG. 20 is a front view schematically showing this further embodiment of the honeycomb structure of the present invention. FIG. 21 is a schematic view showing a cross section taken along the A-A' line of FIG. 20. FIG. 22 is a side view schematically showing this further embodiment of the honeycomb structure of the present invention.

Respective conditions of the honeycomb structure 800 of the present embodiment are preferably the same conditions as in the other embodiment of the honeycomb structure of the present invention (the honeycomb structure 300 (see FIG. 10)), except the following conditions (X). The conditions (X) are that "the electrode terminal projecting portions 22 to be connected to the electric wires are arranged in the center portions of the respective electrode parts 21 and 21 in the cross section perpendicular to the extending direction of cells 2, and the center portions of the electrode parts in the extending direction of the cells 2".

In the honeycomb structure of the present embodiment, the electrode part 21 shown in FIG. 20 is preferably disposed. That is, in the electrode part 21 shown in FIG. 20, "portions having a thickness of 0 to 70% of the maximum thickness of the electrode part" are not formed in a region M positioned at the center in the cross section perpendicular to the cell extending direction, but are formed in a region other than the region M positioned at the center. In such a case, the electrode terminal projecting portion 22 can easily be disposed in "the region M positioned at the center" which is not provided with "the portions having the thickness of 0 to 70% of the maximum thickness of the electrode part".

When main components of the electrode part 21 are silicon carbide particles and silicon, main components of the electrode terminal projecting portion 22 are preferably also the silicon carbide particles and silicon. In this way, the electrode terminal projecting portion 22 contains the silicon carbide particles and silicon as the main components, and hence the components of the electrode part 21 are the same as (or close to) the components of the electrode terminal projecting portion 22. Therefore, thermal expansion coefficients of the electrode part 21 and the electrode terminal projecting portion 22 are the same value (or close values). Moreover, materials are the same (or close), and hence a joining strength between the electrode part 21 and the electrode terminal projecting portion 22 increases. In consequence, even when a heat stress is applied to the honeycomb structure, the electrode terminal projecting portion 22 can be prevented from being peeled from the electrode part 21, and a joining portion between the electrode terminal projecting portion 22 and the electrode part 21 can be prevented from being damaged. Here, when "the electrode terminal projecting portion 22 contains the silicon carbide particles and silicon as the main components", it is meant that the electrode terminal projecting portion 22 contains 90 mass % or more of the silicon carbide particles and silicon in the whole material.

There is not any special restriction on a shape of the electrode terminal projecting portion 22, and the shape may be any shape, as long as the electrode terminal projecting portion can be joined to the electrode part 21 and the electric wire. For example, as shown in FIG. 20 to FIG. 22, the electrode terminal projecting portion 22 preferably has a shape obtained by disposing a columnar projection 22b on a quadrangular plate-like base 22a. According to such a shape, the electrode terminal projecting portion 22 can firmly be joined to the electrode part 21 by the base 22a. Moreover, the electric wire can securely be joined to the electrode terminal projecting portion by the projection 22b.

In the electrode terminal projecting portion 22, a thickness of the base 22a is preferably from 1 to 5 mm. The electrode terminal projecting portion 22 having such a thickness can securely be joined to the electrode part 21. When the thickness is smaller than 1 mm, the base 22a weakens, and the projection 22b is easily removed from the base 22a sometimes. When the thickness is larger than 5 mm, a space where the honeycomb structure is disposed enlarges more than necessary.

In the electrode terminal projecting portion 22, a length (a width) of the base 22a is preferably from 10 to 50%, and further preferably from 20 to 40% of a length of the electrode part 21. In such a range, the electrode terminal projecting portion 22 is not easily removed from the electrode part 21. When the length is shorter than 10%, the electrode terminal projecting portion 22 is easily removed from the electrode part 21 sometimes. When the length is longer than 50%, a mass increases sometimes. The above "length (width) of the base 22a" is a length of the base 22a in "an outer peripheral direction in a cross section of a honeycomb structure part 4 which is perpendicular to the cell extending direction". The above "length of the electrode part 21" is a length of the electrode part 21 "in the outer peripheral direction in the cross section of the honeycomb structure part 4 which is perpendicular to the cell extending direction (the direction along the outer periphery)". In the electrode terminal projecting portion 22, the length of the base 22a in "the extending direction of the cells 2" is preferably from 5 to 30% of a length of the honeycomb structure part 4 in the cell extending direction. In such a range of the length of the base 22a in "the extending direction of the cells 2", a sufficient joining strength is obtained. When the length of the base 22a in "the extending direction of the cells 2" is shorter than 5% of the length of the honeycomb structure part 4 in the cell extending direction, the base is easily removed from the electrode part 21 sometimes. Moreover, when the length is longer than 30%, the mass increases sometimes.

In the electrode terminal projecting portion 22, a thickness of the projection 22b is preferably from 3 to 15 mm. With such a thickness, the electric wire can securely be joined to the projection 22b. When the thickness is smaller than 3 mm, the projection 22b is easily broken sometimes. When the thickness is larger than 15 mm, the electric wire is not easily connected sometimes. Moreover, a length of the projection 22b is preferably from 3 to 20 mm. The electric wire can securely be joined to the projection 22b having such a length. When the length is shorter than 3 mm, the electric wire is not easily joined sometimes. When the length is longer than 20 mm, the projection 22b is easily broken sometimes.

An electrical resistivity of the electrode terminal projecting portion 22 is preferably from 0.1 to 2.0 Ωcm, and further preferably from 0.1 to 1.0 Ωcm. In such range of the electrical resistivity of the electrode terminal projecting portion 22, a current can efficiently be supplied from the electrode terminal projecting portion 22 to the electrode part 21 in a piping line through which a high-temperature exhaust gas flows. When the electrical resistivity of the electrode terminal projecting portion 22 is larger than 2.0 Ωcm, the current does not easily flow, and hence the current is not easily supplied to the electrode part 21 sometimes.

A porosity of the electrode terminal projecting portion 22 is preferably from 30 to 45%, and further preferably from 30 to 40%. In such a range of the porosity of the electrode terminal projecting portion 22, a suitable electrical resistivity is obtained. When the porosity of the electrode terminal projecting portion 22 is higher than 45%, a strength of the electrode terminal projecting portion 22 deteriorates sometimes. In particular, when the strength of the projection 22b of the electrode terminal projecting portion 22 deteriorates, the projection 22b is easily broken sometimes. The porosity is a value measured by a mercury porosimeter.

An average pore diameter of the electrode terminal projecting portion 22 is preferably from 5 to 20 μm, and further preferably from 7 to 15 μm. In such a range of the average pore diameter of the electrode terminal projecting portion 22, a suitable electrical resistivity is obtained. When the average pore diameter of the electrode terminal projecting portion 22 is larger than 20 μm, the strength of the electrode terminal projecting portion 22 deteriorates sometimes. In particular, when the strength of the projection 22b of the electrode terminal projecting portion 22 deteriorates, the projection 22b is easily broken sometimes. The average pore diameter is a value measured by the mercury porosimeter.

When main components of the electrode terminal projecting portion 22 are silicon carbide particles and silicon, an average particle diameter of the silicon carbide particles contained in the electrode terminal projecting portion 22 is preferably from 10 to 60 μm, and further preferably from 20 to 60 μm. In such a range of the average particle diameter of the silicon carbide particles contained in the electrode terminal projecting portion 22, the electrical resistivity of the electrode terminal projecting portion 22 can be from 0.1 to 2.0 Ωcm. When an average pore diameter of the silicon carbide particles contained in the electrode terminal projecting portion 22 is smaller than 10 μm, the electrical resistivity of the electrode terminal projecting portion 22 excessively increases sometimes. When the average pore diameter of the silicon carbide particles contained in the electrode terminal projecting portion 22 is larger than 60 μm, the electrical resistivity of the electrode terminal projecting portion 22 excessively decreases sometimes. The average particle diameter of the silicon carbide particles contained in the electrode terminal projecting portion 22 is a value measured by a laser diffraction method.

A ratio of a mass of silicon contained in the electrode terminal projecting portion 22 is preferably from 20 to 40 mass %, and further preferably from 25 to 35 mass %. "The ratio of the mass of silicon contained in the electrode terminal projecting portion 22" is a ratio of the mass of silicon contained in the electrode terminal projecting portion 22 to "a total of respective masses of the silicon carbide particles and silicon" contained in the electrode terminal projecting portion 22. In such a range of the ratio of the mass of silicon contained in the electrode terminal projecting portion 22, the electrical resistivity of 0.1 to 2.0 Ωcm can easily be obtained. When the ratio of the mass of silicon contained in the electrode terminal projecting portion 22 is smaller than 20 mass %, the electrical resistivity excessively increases sometimes. Moreover, when the ratio is larger than 40 mass %, each of the electrode terminal projecting portions is deformed sometimes at manufacturing.

Figure 23:
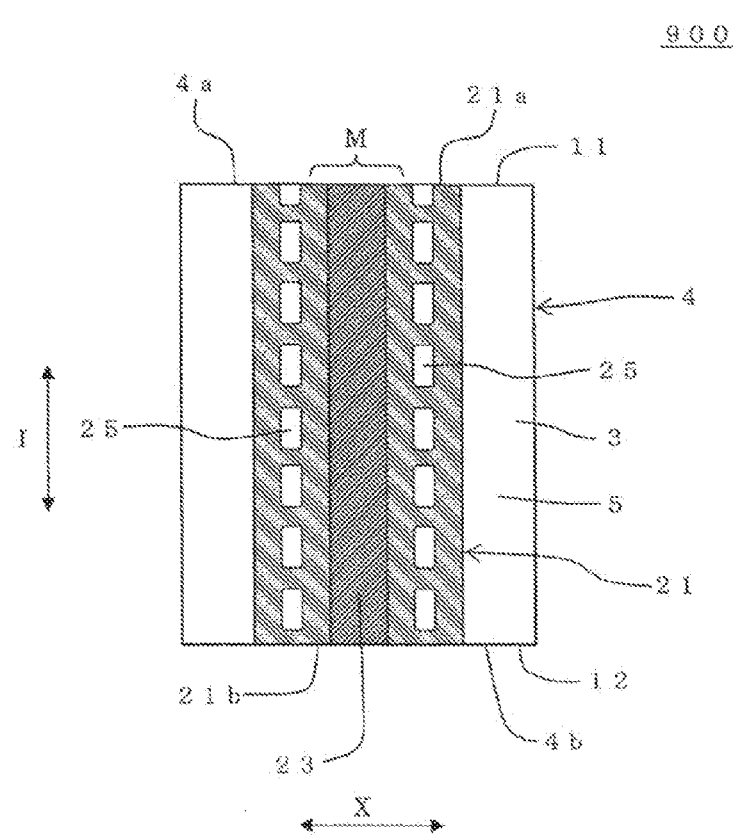
FIG. 23 is a front view schematically showing a still further embodiment of the honeycomb structure of the present invention.

[3] Honeycomb Structure:

Next, a still further embodiment of the honeycomb structure of the present invention will be described. In a honeycomb structure 900 of the present embodiment, the surface of the electrode part 21 of the above-mentioned further embodiment (the honeycomb structure 300) of the honeycomb structure of the present invention shown in FIG. 10 is provided with a conductor 23 having an electrical resistivity lower than that of the electrode part 21. Specifically, in the honeycomb structure 900, the electrode part 21 shown in FIG. 23 is formed, and the conductor 23 is disposed in a region M positioned at the center. In a cross section of the electrode part 21 which is perpendicular to a cell extending direction, "portions having a thickness of 0 to 70% of the maximum thickness of the electrode part" are not formed in the region M positioned at the center, but are formed in a region other than the region M positioned at the center. Therefore, the honeycomb structure 900 of the present embodiment preferably has the same conditions as those of the honeycomb structure 300 of the above embodiment (see FIG. 10), except that the honeycomb structure has the conductor 23. FIG. 23 is a front view schematically showing this still further embodiment of the honeycomb structure of the present invention.

Consequently, in the honeycomb structure 900 of the present embodiment, the conductor 23 having the electrical resistivity lower than that of the electrode part 21 is disposed on the surface of the electrode part 21. Therefore, by applying a voltage to the conductor 23, it is possible to allow a current to more evenly flow through the whole honeycomb structure part.

The electrical resistivity of the conductor 23 is preferably from 0.0001 to 70%, further preferably from 0.001 to 50%, and especially preferably from 0.001 to 10% of the electrical resistivity of the electrode part 21. When the electrical resistivity is smaller than 0.0001%, the flow of the current in an outer peripheral direction in a cross section perpendicular to the central axis of the honeycomb structure part decreases, and a deviation of a temperature distribution increases sometimes. When the electrical resistivity is larger than 70%, an effect of the honeycomb structure 900 to suppress the deviation of the temperature distribution deteriorates sometimes. The electrical resistivity is a value at 400° C.

There is not any special restriction on a shape of the conductor 23. As shown in FIG. 23, the shape is preferably a rectangular shape extending from one end portion 21a to the other end portion 21b of the electrode part. It is to be noted that the conductor 23 does not have to be disposed along a region between both the end portions of the electrode part. That is, a space may be made between an end portion of the conductor 23 and the end portion of the electrode part. A length of the conductor 23 is preferably 50% or more, further preferably 80% or more, and especially preferably 100% of a length of the electrode part 21. When the length is shorter than 50%, the effect of allowing the current to more evenly flow through the whole honeycomb structure part when the voltage is applied deteriorates sometimes. The above "length of the conductor 23" is a length in an extending direction of "cells of the honeycomb structure part". The above "length of the electrode part 21" is a length in the extending direction of "the cells of the honeycomb structure part".

Moreover, there is not any special restriction on a length of the conductor 23 in a peripheral direction (the peripheral direction in an outer periphery of the honeycomb structure part), as long as the length is not more than the length of the electrode part in the peripheral direction. The length of the conductor 23 in the peripheral direction is preferably from 5 to 75%, and further preferably from 10 to 60% of the length of the electrode part in the peripheral direction. When the length is longer than 75%, a temperature of the honeycomb structure part easily rises in the vicinities of both ends of the electrode part 21 sometimes, in a cross section perpendicular to the cell extending direction. When the length is shorter than 5%, the effect of allowing the current to more evenly flow through the whole honeycomb structure part when the voltage is applied deteriorates (cannot sufficiently be obtained) sometimes.

An example of a material of the conductor 23 is a material formed by impregnating a silicon carbide structural body with silicon so as to achieve a porosity of 5% or less.

Moreover, a thickness of the conductor 23 is preferably from 0.1 to 2 mm, further preferably from 0.2 to 1.5 mm, and especially preferably from 0.3 to 1 mm. When the thickness is larger than 2 mm, a heat shock resistance of the honeycomb structure deteriorates sometimes. When the thickness is smaller than 0.1 mm, a strength of the conductor 23 deteriorates sometimes.

It is to be noted that the honeycomb structure of the present embodiment can be used as a catalyst support. The honeycomb structure of the present embodiment, onto which a known catalyst is loaded by a known method, can be used as a catalyst for treatment of an exhaust gas.

[4] Manufacturing Method of Honeycomb Structure:

Next, a manufacturing method of the honeycomb structure of the present invention will be described. There will be described a method of manufacturing the honeycomb structure 800 (see FIG. 20 to FIG. 22) which is the above further embodiment of the honeycomb structure of the present invention (hereinafter referred to as "a manufacturing method (A)" sometimes).

[4-1] Preparation of Formed Honeycomb Body:

First, metal silicon powder (metal silicon), a binder, a surfactant, a pore former, water and the like are added to silicon carbide powder (silicon carbide), to prepare a forming raw material. A mass of metal silicon to a total of a mass of the silicon carbide powder and the mass of metal silicon is preferably from 10 to 40 mass %. An average particle diameter of silicon carbide particles in the silicon carbide powder is preferably from 3 to 50 μm, and further preferably from 5 to 20 μm. An average particle diameter of metal silicon (the metal silicon powder) is preferably from 2 to 35 μm. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder. It is to be noted that this is a blend of the forming raw material when the material of the honeycomb structure part is a silicon-silicon carbide composite material. When the material of the honeycomb structure part is silicon carbide, metal silicon is not added.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as pores are formed after the firing, but examples of the pore former include graphite, starch, resin balloons, a water-absorbing resin, and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 μm. When the average particle diameter is smaller than 10 μm, the pores cannot sufficiently be formed. When the average particle diameter is larger than 30 μm, a die is clogged sometimes at forming. The average particle diameter of the pore former is a value measured by the laser diffraction method.

Next, the forming raw material is kneaded to form a kneaded material. There is not any special restriction on a method of kneading the forming raw material to form the kneaded material, and an example of the method is a method in which a kneader, a vacuum clay kneader or the like is used.

Next, the kneaded material is extruded to obtain a formed honeycomb body. In the extrusion forming, a die having a desirable whole shape, cell shape, partition wall thickness, cell density and the like is preferably used. A material of the die is preferably a hard metal which does not easily wear down. The formed honeycomb body has a constitution having partition walls with which a plurality of cells are formed to become through channels of a fluid, and an outer peripheral wall positioned on an outermost periphery.

The partition wall thickness, cell density, outer peripheral wall thickness and the like of the formed honeycomb body can suitably be determined in accordance with a constitution of the honeycomb structure of the present invention which is to be prepared, in consideration of shrinkages at drying and firing.

The obtained formed honeycomb body is preferably dried. There is not any special restriction on a drying method, and examples of the method include electromagnetic heating systems such as microwave heating drying and high-frequency dielectric heating drying, and external heating systems such as hot air drying and superheat vapor drying. In these examples, it is preferable that a predetermined amount of water content is dried by the electromagnetic heating system, and then the remaining water content is dried by the external heating system. The whole formed body can immediately and evenly be dried so that any cracks are not generated. As drying conditions, it is preferable that the water content of 30 to 99 mass % of an amount of the water content prior to the drying is removed by the electromagnetic heating system, and then the water content is decreased to 3 mass % or less by the external heating system. The electromagnetic heating system is preferably the dielectric heating drying. The external heating system is preferably the hot air drying.

When the length of the formed honeycomb body in the central axis direction is not a desirable length, both end surfaces (both end portions) of the formed honeycomb body are preferably cut so that the length is the desirable length. There is not any special restriction on a cutting method, and an example of the cutting method is a method using a disc saw cutter or the like.

[4-2] Preparation of Electrode Part Forming Raw Material:

Next, an electrode part forming raw material to form the electrode parts is prepared. When the main components of the electrode parts are silicon carbide and silicon, the electrode part forming raw material is preferably formed by adding predetermined additives to silicon carbide powder and silicon powder, followed by kneading. It is to be noted that when the electrode part constituted of the center portion and the extended portions is formed, a center portion forming raw material and an extended portion forming raw material are prepared, respectively. When main components of the center portion are silicon carbide and silicon, the center portion forming raw material is preferably obtained by adding predetermined additives to silicon carbide powder and silicon powder, followed by kneading. When main components of the extended portions are silicon carbide and silicon, the extended portion forming raw material is preferably obtained by adding predetermined additives to silicon carbide powder and silicon powder, followed by kneading.

Specifically, metal silicon powder (metal silicon), a binder, a surfactant, a pore former, water and the like are added to the silicon carbide powder (silicon carbide), and kneaded to prepare the electrode part forming raw material. A mass of metal silicon is preferably from 20 to 40 parts by mass, when a total mass of the silicon carbide powder and metal silicon is 100 parts by mass. An average particle diameter of silicon carbide particles in the silicon carbide powder is preferably from 10 to 60 μm. An average particle diameter of the metal silicon powder (metal silicon) is preferably from 2 to 20 μm. When the average particle diameter is smaller than 2 μm, an electrical resistivity excessively decreases sometimes. When the average particle diameter is larger than 20 μm, the electrical resistivity excessively increases sometimes. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pores are formed after the firing, and examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the paste-like electrode part forming raw material. There is not any special restriction on a kneading method, and, for example, a vertical stirrer can be used.

Next, the obtained electrode part forming raw material is preferably applied to the side surface of the dried formed honeycomb body. There is not any special restriction on a method of applying the electrode part forming raw material to the side surface of the formed honeycomb body, and, for example, a printing method can be used. Specifically, in a case where the through holes are formed, the electrode part forming raw material is not applied to portions to be provided with the through holes. "The case where the through holes are formed" is a case where "the portions having the thickness of 0% of the maximum thickness of the electrode part" are formed. Moreover, in a case where dents are formed, first, the electrode part forming raw material is applied so as to achieve a uniform thickness by printing, to form a first layer, and the electrode part forming raw material is applied to this first layer by the printing, to form a second layer. "The case where the dents are formed" is a case where "portions having a thickness in excess of 0% and 70% or less of the maximum thickness of the electrode part" are formed. When the second layer is formed, the electrode part forming raw material is not applied to portions to be provided with the dents. In consequence, the electrode part having the dents can be formed. It is to be noted that when a method by the printing is used, the electrode part forming raw material can be applied into a desirable shape. Therefore, a shape and arrangement of the electrode parts can suitably be set. It is to be noted that when the electrode part constituted of the center portion and the extended portions is formed, the respective center portion forming raw material and extended portion forming raw material are preferably applied to the side surface of the dried formed honeycomb body so as to achieve shapes of the center portion 21X and extended portions 21Y of the electrode part 21 in the honeycomb structure 503 shown in FIG. 18 and FIG. 19. There is not any special restriction on a method of applying the center portion forming raw material and the extended portion forming raw material to the side surface of the formed honeycomb body, and similarly to the case where the electrode part forming raw material is applied, for example, the method by the printing can be used.

A thickness of each of the electrode parts can be set to a desirable thickness, by regulating the thickness of the electrode part forming raw material when the material is applied. In consequence, the electrode part can be formed simply by applying the electrode part forming raw material to the side surface of the formed honeycomb body, and carrying out the drying and firing. Therefore, the electrode part can very easily be formed.

It is to be noted that to obtain the above-mentioned electrode part in which "the region M positioned at the center" is not provided with "the portions having the thickness of 0 to 70% of the maximum thickness of the electrode part", a printing pattern is adjusted so that the electrode part is formed by the printing. That is, the printing may be performed so that "the portions having the thickness of 0 to 70% of the maximum thickness of the electrode part" are not formed in "the region M positioned at the center".

Next, the electrode part forming raw material applied to the side surface of the formed honeycomb body is preferably dried. In consequence, it is possible to obtain the dried "formed honeycomb body". A drying condition is preferably from 50 to 100° C. The above dried "formed honeycomb body" is the dried "formed honeycomb body to which the electrode part forming raw material is applied (any electrode terminal projecting portion forming members are not attached)".

It is to be noted that a honeycomb body similar to "the formed honeycomb body to which the electrode part forming raw material is applied (any electrode terminal projecting portion forming members are not attached)" can be prepared by the following method. That is, the method is a method of separately forming a sheet made of the electrode part forming raw material provided with the through holes and/or the dents, and attaching this sheet to the side surface of the above dried formed honeycomb body. The above sheet can be prepared, for example, by the method of applying the electrode part forming raw material or the like in a state where the above electrode part forming raw material is not applied only to a desirable portion on the surface of a flat plate-like member.

[4-3] Preparation of Electrode Terminal Projecting Portion Forming Member:

Next, the electrode terminal projecting portion forming member is preferably prepared. The electrode terminal projecting portion forming member is attached to the formed honeycomb body, to form the electrode terminal projecting portion. There is not any special restriction on a shape of the electrode terminal projecting portion forming member, but a shape shown in, for example, FIG. 20 to FIG. 22 is preferably formed. Moreover, the obtained electrode terminal projecting portion forming member is preferably attached to a portion to which the electrode part forming raw material is applied, in the formed honeycomb body to which the electrode part forming raw material is applied. It is to be noted that an order of the preparation of the formed honeycomb body, the preparation of the electrode part forming raw material and the preparation of the electrode terminal projecting portion forming member may be any order.

The electrode terminal projecting portion forming member is preferably obtained by forming and drying an electrode terminal projecting portion forming raw material (the raw material to form the electrode terminal projecting portion forming member). When the main components of the electrode terminal projecting portion are silicon carbide and silicon, the electrode terminal projecting portion forming raw material is preferably formed by adding predetermined additives to silicon carbide powder and silicon powder and kneading this mixture.

Specifically, metal silicon powder (metal silicon), a binder, a surfactant, a pore former, water and the like are added to the silicon carbide powder (silicon carbide), and kneaded to prepare the electrode terminal projecting portion forming raw material. A mass of metal silicon is preferably from 20 to 40 mass % of a total of a mass of the silicon carbide powder and a mass of metal silicon. An average particle diameter of silicon carbide particles in the silicon carbide powder is preferably from 10 to 60 µm. An average particle diameter of the metal silicon powder (metal silicon) is preferably from 2 to 20 µm. When the average particle diameter is smaller than 2 µm, an electrical resistivity excessively decreases sometimes. When the average particle diameter is larger than 20 µm, the electrical resistivity excessively increases sometimes. The average particle diameters of the silicon carbide particles and metal silicon particles (metal silicon) are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when the total mass of the silicon carbide powder and the metal silicon powder is 100 parts by mass.

A content of the water is preferably from 20 to 40 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as the pores are formed after the firing, and examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter is smaller than 10 µm, the pores cannot sufficiently be formed sometimes. When the average particle diameter is larger than 30 µm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the electrode terminal projecting portion forming raw material. There is not any special restriction on a kneading method, and, for example, a kneader can be used.

There is not any special restriction on a method of forming the obtained electrode terminal projecting portion forming raw material, to achieve a shape of the electrode terminal projecting portion forming member, and an example of the method is a method of carrying out processing after extrusion forming.

It is preferable that the electrode terminal projecting portion forming raw material is formed into the shape of the electrode terminal projecting portion forming member, and then dried to obtain the electrode terminal projecting portion forming member. A drying condition is preferably from 50 to 100° C.

Next, the electrode terminal projecting portion forming member is preferably attached to the formed honeycomb body to which the electrode part forming raw material is applied. There is not any special restriction on a method of attaching the electrode terminal projecting portion forming member to the formed honeycomb body (the portion of the formed honeycomb body to which the electrode part forming raw material is applied). The electrode terminal projecting portion forming member is preferably attached to the formed honeycomb body by use of the above electrode part forming raw material. For example, first, the electrode part forming raw material is applied to "the surface" of the electrode terminal projecting portion forming member "which is attached to the formed honeycomb body (the surface which comes in contact with the formed honeycomb body)". Afterward, the electrode terminal projecting portion forming member is preferably attached to the formed honeycomb body so that "the surface to which the electrode part forming raw material is applied" comes in contact with the formed honeycomb body.

Then, "the formed honeycomb body to which the electrode part forming raw material is applied and the electrode terminal projecting portion forming member is attached" is preferably dried and fired, to obtain the honeycomb structure of the present invention. It is to be noted that when the one embodiment (the honeycomb structure 100, see FIG. 1 to FIG. 4) of the honeycomb structure of the present invention is prepared, the above dried "formed honeycomb body to which the electrode part forming raw material is applied (any electrode terminal projecting portion forming members are not attached)" may be fired.

A drying condition at this time is preferably from 50 to 100° C.

Moreover, prior to the firing, calcinating is preferably performed to remove the binder and the like. The calcinating is preferably performed at 400 to 500° C. in the atmosphere for 0.5 to 20 hours. There is not any special restriction on a calcinating and firing method, and the firing can be performed by using an electric furnace, a gas furnace or the like. As firing conditions, heating is preferably performed at 1400 to 1500° C. in an inert atmosphere of nitrogen, argon or the like for one to 20 hours. Moreover, after the firing, an oxidation treatment is preferably performed at 1200 to 1350° C. for one to ten hours, to enhance a durability.

It is to be noted that the electrode terminal projecting portion forming member may be attached before or after firing the formed honeycomb body. When the electrode terminal projecting portion forming member is attached after firing the formed honeycomb body, the formed honeycomb body is preferably then fired again on the above conditions.

[5] Manufacturing Method of Honeycomb Structure:

Next, a manufacturing method of the honeycomb structure 900 shown in FIG. 23 will be described.

According to the manufacturing method of the honeycomb structure 900, in the above manufacturing method (A), "the dried formed honeycomb body" is prepared, and then the electrode terminal projecting portion forming member is not attached, but the conductor 23 is disposed.

An example of a method of disposing the conductor 23 in "the dried formed honeycomb body" is a method of attaching the conductor 23 to the surface of the electrode part, and performing the firing. The above "dried formed honeycomb body" is the dried "formed honeycomb body to which the electrode part forming raw material is applied (any electrode terminal projecting portion forming members are not attached)". It is preferable to use the electrode part 21 in which in the cross section perpendicular to the cell extending direction, "the portions having the thickness of 0 to 70% of the maximum thickness of the electrode part" are not formed in the region M positioned at the center, but are formed in the region other than the region M (see FIG. 23). The conductor 23 is preferably disposed in the region M positioned at the center (see FIG. 23).

EXAMPLES

Hereinafter, examples of the present invention will specifically be described, but the present invention is not limited to these examples.

Example 1

Silicon carbide (SiC) powder and metal silicon (Si) powder were mixed at a mass ratio of 80:20. To this mixture, hydroxypropyl methylcellulose as a binder and a water-absorbing resin as a pore former were added, and water was added, to prepare a forming raw material. Afterward, the forming raw material was kneaded by a vacuum clay kneader, to prepare a columnar kneaded material. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 µm. An average particle diameter of the metal silicon powder was 6 µm. Moreover, an average particle diameter of the pore former was 20 µm. The average particle diameters of silicon carbide, metal silicon and the pore former were values measured by a laser diffraction method.

The obtained columnar kneaded material was formed by using an extrusion forming machine, to obtain a formed honeycomb body. The obtained formed honeycomb body was subjected to high-frequency dielectric heating and drying. Afterward, the formed honeycomb body was dried at 120° C. for two hours by use of a hot air drier, and both end surfaces of the formed honeycomb body were cut as much as predetermined amounts.

Next, silicon carbide (SiC) powder and metal silicon (Si) powder were mixed at a mass ratio of 60:40. To this mixture, hydroxypropyl methylcellulose as a binder, glycerin as a moisture retaining agent and a surfactant as a dispersant were added, and water was also added, and mixed. This mixture was kneaded to prepare an electrode part forming raw material. A content of the binder was 0.5 part by mass, when a total of the silicon carbide (SiC) powder and the metal silicon (Si) powder was 100 parts by mass. A content of glycerin was 10 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 52 µm. An average particle diameter of the metal silicon powder was 6 µm. The average particle diameters of silicon carbide and metal silicon were values measured by the laser diffraction method. The kneading was carried out by a vertical stirrer.

Next, the electrode part forming raw material was applied, in a band-like state, to the side surface of the dried formed honeycomb body so that the maximum thickness of the electrode (the thickness after drying and firing) was 0.25 mm and "0.5 time a center angle was 49.3° in a cross section perpendicular to a cell extending direction". When the electrode part forming raw material was applied, the following printing pattern was set. That is, the printing pattern was set so that a plurality of through holes having a round outer peripheral shape were orderly arranged in an extending direction of cells of a honeycomb structure, the through holes were formed in a plurality of rows in a peripheral direction, and the above through holes were not formed in an electrode center portion. The above "electrode center portion" was the center portion in the cell extending direction of the honeycomb structure, and the center portion in the peripheral direction of the honeycomb structure. The above "printing pattern" is specifically a printing pattern in which any through holes are not formed in the above electrode center portion in the electrode part 21 of the honeycomb structure 200 shown in FIG. 8. The electrode part forming raw material was applied to two portions of the side surface of the dried formed honeycomb body. Then, in the cross section perpendicular to the cell extending direction, one of the two portions to which the electrode part forming raw material was applied was disposed opposite to the other portion via the center of the formed honeycomb body. A shape of the electrode part forming raw material applied to the side surface of the formed honeycomb body was a substantially rectangular shape.

Next, the electrode part forming raw material applied to the formed honeycomb body was dried. A drying condition was 70° C.

Next, silicon carbide (SiC) powder and metal silicon (Si) powder were mixed at a mass ratio of 60:40. To this mixture, hydroxypropyl methylcellulose as a binder was added, and water was also added, and mixed. This mixture was kneaded to prepare an electrode terminal projecting portion forming raw material. The electrode terminal projecting portion forming raw material was kneaded by using a vacuum clay kneader, to prepare a kneaded material. A content of the binder was 4 parts by mass, when a total of the silicon carbide (SiC) powder and the metal silicon (Si) powder was 100 parts by mass. A content of the water was 22 parts by mass, when the total of the silicon carbide (SiC) powder and the metal silicon (Si) powder was 100 parts by mass. An average particle diameter of the silicon carbide powder was 52 µm. An average particle diameter of the metal silicon powder was 6 µm. The average particle diameters of silicon carbide and metal silicon were values measured by the laser diffraction method.

The obtained kneaded material was processed into a shape (the shape constituted of a base and a projection) as in an electrode terminal projecting portion 22 shown in FIG. 20 to FIG. 22, and was dried, to obtain an electrode terminal projecting portion forming member. Moreover, a drying condition was 70° C. A portion corresponding to a plate-like base 22a had a size of "3 mm×12 mm×15 mm". Moreover, a portion corresponding to a projection 22b was a columnar portion having a bottom surface diameter of 7 mm and a length of 10 mm in a central axis direction. Two electrode terminal projecting portion forming members were prepared.

Next, the two electrode terminal projecting portion forming members were attached to two portions of the formed honeycomb body to which the electrode part forming raw material was applied, respectively. The electrode terminal projecting portion forming members were attached to the portions of the formed honeycomb body to which the electrode part forming raw material was applied, by use of the electrode part forming raw material. Afterward, "the formed honeycomb body to which the electrode part forming raw material was applied and the electrode terminal projecting portion forming members were attached" was degreased, fired, and further subjected to an oxidation treatment to obtain a honeycomb structure. Degreasing conditions were 550° C. and three hours. Firing conditions were 1450° C. and two hours in an argon atmosphere. Conditions of the oxidation treatment were 1300° C. and one hour.

An average pore diameter (an air pore diameter) of partition walls of the obtained honeycomb structure was 8.6 µm. A porosity was 45%. The average pore diameter and the porosity were values measured by a mercury porosimeter. Furthermore, a thickness of each of the partition walls of the honeycomb structure was 101.6 µm and a cell density was 93 cells/cm$^2$. Moreover, a bottom surface of the honeycomb structure had a round shape of a diameter of 93 mm. A length of the honeycomb structure in the cell extending direction was 100 mm. Furthermore, an isostatic strength of the obtained honeycomb structure was 2.5 MPa. The isostatic strength is a breaking strength measured under a hydrostatic pressure in water. Additionally, 0.5 time the center angle in the cross section of each of two electrode parts of the honeycomb structure which was perpendicular to the cell extending direction was 49.3°. Moreover, a thickness of each of the electrode parts was 0.25 mm. Furthermore, an electrical resistivity of the electrode part was 0.8 Ωcm, an electrical resistivity of a honeycomb structure part was 40 Ωcm, and an electrical resistivity of an electrode terminal projecting portion was 0.8 Ωcm. Additionally, the electrode part was formed to extend from one end surface to the other end surface. Moreover, the electrical resistivity of the electrode terminal projecting portion was 0.8 Ωcm in each of examples and comparative examples.

Additionally, the electrical resistivities of the honeycomb structure part, each of the electrode parts and each of the electrode terminal projecting portions were measured by the following method. A test piece of 10 mm×10 mm×50 mm was prepared by using the same material as that of an object to be measured. That is, when the electrical resistivity of the honeycomb structure part was measured, the test piece was prepared by using the same material as that of the honeycomb structure part. When the electrical resistivity of the electrode part was measured, the test piece was prepared by using the same material as that of the electrode part. Moreover, when the electrical resistivity of the electrode terminal projecting portion was measured, the test piece was prepared by using the same material as that of the electrode terminal projecting portion. All surfaces of both end portions (both the end portions in a longitudinal direction) of each of the test pieces were coated with a silver paste, and provided with a wiring line, thereby enabling energization. A voltage applying current measuring device was connected to the test piece, to apply a voltage thereto. A thermocouple was disposed in the center of the test piece, and a change of a temperature of the test piece with an elapse of time when applying the voltage was confirmed by a recorder. A voltage of 100 to 200 V was applied, and a current value and a voltage value were measured in a state where the temperature of the test piece was 400° C. The electrical resistivity was calculated from the obtained current value and voltage value, and a test piece dimension.

The obtained honeycomb structure was subjected to evaluation of "a heat shock resistance", "resistance values before and after a heat shock resistance test" and "heat generation deviation" by the following methods. The results are shown in Table 1.

[Heat Shock Resistance]

The honeycomb structure was contained in a metal case of a propane gas burner test machine, and a heating cooling test of the honeycomb structure was carried out by using this propane gas burner test machine. In this case, an evaluation test of a temperature difference in the honeycomb structure was carried out. In the propane gas burner test machine, it is possible to supply a heated gas by use of a gas burner to burn a propane gas.

Specifically, first, the obtained honeycomb structure was contained (canned) in the metal case of the propane gas burner test machine. Then, the gas (the heated gas) heated by the above gas burner test machine was supplied into this metal case, and was allowed to flow through the honeycomb structure. At this time, temperature conditions of the heated gas allowed to flow into the metal case (the temperature of the heated gas at an inlet of the metal case) were as follows. First, the temperature of the gas was raised to 950° C. for five minutes immediately after the start of the supply of the gas, and then the heated gas of 950° C. was supplied for ten minutes, thereby holding the honeycomb structure at 950° C. for ten minutes. For subsequent five minutes, the honeycomb structure was cooled down to 100° C., and then the temperature of the honeycomb structure was maintained at 100° C. for ten minutes. Then, a heating cooling cycle in which "after raising the temperature of the honeycomb structure from 100 to 950° C. for five minutes, the honeycomb structure was maintained at 950° C. for ten minutes, and then cooled down to 100° C. for five minutes" was repeated as much as 100 cycles. Afterward, the honeycomb structure was cooled down to room temperature, and a generation state of cracks in the honeycomb structure was confirmed. The result of the heat shock resistance evaluation is shown in a column of "heat shock resistance" of Table 1. "No crack" in the column of "heat shock resistance" indicates that any cracks were not generated in the honeycomb structure, and "cracks were present" indicates that the cracks were generated in the honeycomb structure. "No crack" passed, and "cracks were present" failed.

[Resistance Values before and after Heat Shock Resistance Test]

A resistance value of the honeycomb structure before carrying out the above "heat shock resistance" test was beforehand measured, and the resistance value of the honeycomb structure after carrying out the "heat shock resistance" test was measured. When a difference between the resistance values before and after the "heat shock resistance" test was within 5% of the resistance value of the honeycomb structure before the "heat shock resistance" test, "resistance change" was "no change". When the above difference between the resistance values was in excess of 5% of the resistance value of the honeycomb structure before the "heat shock resistance" test, "the resistance change" was "present". The measurement of the resistance value was carried out by connecting a wiring line to the electrode terminal projecting portion of the honeycomb structure to perform the energization. At the measurement, a voltage applying current measuring device was connected to the honeycomb structure, to apply the voltage thereto. A voltage of 100 to 200 V was applied, and a current value and a voltage value were measured. The electrical resistivity of the honeycomb structure was calculated from the obtained current value and voltage value, and a resistance value which became minimum during the energization was the resistance value (the resistance) of the honeycomb structure. When large cracks were generated, the resistance value increased. A case where "the resistance change" was "no change" passed, and a case where "the resistance change" was "present" failed. It is to be noted that in Table 1, the present evaluation is shown as "the resistance value".

[Heat Generation Deviation]

First, a voltage of 200 V was applied to the honeycomb structure, to carry out an energization test. Then, the highest temperature of the honeycomb structure at this time was measured. Afterward, the heat generation deviation of the honeycomb structure was evaluation in accordance with the following standard. Additionally, when the highest temperature of the above honeycomb structure is not more than 200° C., it can be considered that the deviation of a temperature distribution in the honeycomb structure is suppressed.

a catalyst support, and also functioned as a heater when a voltage was applied thereto and that each of the honeycomb structures had an excellent heat shock resistance as compared with the honeycomb structures of Comparative Examples 1 to 3.

It was possible to confirm that in each of Examples 2 to 6, a ratio value (S/U) was in a range of 0.1 to 0.8, and hence heat generation deviation was suitably evaluated as compared with Example 1. That is, it was possible to confirm that the deviation of the temperature distribution in each of the honeycomb structures was suppressed.

It was possible to confirm that in each of Examples 14 and 15, an electrical resistivity of each of electrode parts was in a range of 0.1 to 100 Ωcm, and hence heat generation deviation was suitably evaluated as compared with Examples 13 and 16. That is, it was possible to confirm that

TABLE 1

| | Ratio to maximum thickness (%) | Ratio value (S/U) | Maximum thickness of electrode part (mm) | Thickness of outer peripheral wall (mm) | Electrical resistivity of electrode part (Ωcm) | Electrical resistivity of honeycomb structure part (Ωcm) | Angle of 0.5 time center angle (θ) | Heat shock resistance | Resistance value | Heat generation deviation |
|---|---|---|---|---|---|---|---|---|---|---|
| Example 1 | 0 | 0.05 | 0.5 | 0.3 | 0.8 | 40 | 49.5 | No cracks | No change | 230 |
| Example 2 | 0 | 0.1 | 0.5 | 0.3 | 0.8 | 40 | 49.5 | No cracks | No change | 185 |
| Example 3 | 0 | 0.3 | 0.5 | 0.3 | 0.8 | 40 | 49.5 | No cracks | No change | 172 |
| Example 4 | 0 | 0.5 | 0.5 | 0.3 | 0.8 | 40 | 49.5 | No cracks | No change | 155 |
| Example 5 | 0 | 0.7 | 0.5 | 0.3 | 0.8 | 40 | 49.5 | No cracks | No change | 141 |
| Example 6 | 0 | 0.8 | 0.5 | 0.3 | 0.8 | 40 | 49.5 | No cracks | No change | 129 |
| Comparative Example 1 | 100 | 1 | 0.5 | 0.3 | 0.8 | 40 | 49.5 | Cracks were present | No change | 101 |
| Example 7 | 10 | 0.5 | 0.5 | 0.3 | 0.8 | 40 | 49.5 | No cracks | No change | 145 |
| Example 8 | 30 | 0.5 | 0.5 | 0.3 | 0.8 | 40 | 49.5 | No cracks | No change | 140 |
| Example 9 | 70 | 0.5 | 0.5 | 0.3 | 0.8 | 40 | 49.5 | No cracks | No change | 125 |
| Example 10 | 0 | 0.5 | 0.5 | 0.3 | 0.8 | 1 | 49.5 | No cracks | No change | 188 |
| Example 11 | 0 | 0.5 | 0.5 | 0.3 | 0.8 | 200 | 49.5 | No cracks | No change | 186 |
| Example 12 | 0 | 0.5 | 0.5 | 0.3 | 0.05 | 40 | 49.5 | No cracks | No change | 222 |
| Example 13 | 0 | 0.5 | 0.5 | 0.3 | 0.1 | 40 | 50.5 | No cracks | No change | 165 |
| Example 14 | 0 | 0.5 | 0.5 | 0.3 | 100 | 40 | 51.5 | No cracks | No change | 187 |
| Example 15 | 0 | 0.5 | 0.5 | 0.3 | 150 | 40 | 52.5 | No cracks | No change | 245 |
| Example 16 | 0 | 0.5 | 0.001 | 0.3 | 0.8 | 40 | 49.5 | No cracks | No change | 231 |
| Example 17 | 0 | 0.5 | 0.025 | 0.3 | 0.8 | 40 | 49.5 | No cracks | No change | 182 |
| Example 18 | 0 | 0.5 | 0.1 | 0.3 | 0.8 | 40 | 49.5 | No cracks | No change | 170 |
| Example 19 | 0 | 0.5 | 1 | 0.3 | 0.8 | 40 | 49.5 | No cracks | No change | 128 |
| Example 20 | 0 | 0.5 | 1.2 | 0.3 | 0.8 | 40 | 49.5 | No cracks | No change | 110 |
| Example 21 | 0 | 0.5 | 0.5 | 0.3 | 0.8 | 40 | 10 | No cracks | No change | 209 |
| Example 22 | 0 | 0.5 | 0.5 | 0.3 | 0.8 | 40 | 15 | No cracks | No change | 175 |
| Example 23 | 0 | 0.5 | 0.5 | 0.3 | 0.8 | 40 | 40 | No cracks | No change | 158 |
| Example 24 | 0 | 0.5 | 0.5 | 0.3 | 0.8 | 40 | 65 | No cracks | No change | 178 |
| Example 25 | 0 | 0.5 | 0.5 | 0.3 | 0.8 | 40 | 70 | No cracks | No change | 202 |
| Comparative Example 2 | 75 | 0.5 | 0.5 | 0.3 | 0.8 | 40 | 49.5 | Cracks were present | No change | 112 |
| Comparative Example 3 | 90 | 0.5 | 0.5 | 0.3 | 0.8 | 40 | 49.5 | Cracks were present | No change | 103 |

Examples 2 to 25 and Comparative Examples 1 to 3

The procedures of Example 1 were repeated except that electrode parts and a honeycomb structure part of each of honeycomb structures were changed to satisfy values shown in Table 1, to prepare each of the honeycomb structures.

Each of the obtained honeycomb structures was subjected to evaluation of "a heat shock resistance", "resistance values before and after a heat shock resistance test" and "heat generation deviation" by the above methods. The results are shown in Table 1.

As apparent from Table 1, it was possible to confirm that each of the honeycomb structures of Examples 1 to 25 was the deviation of the temperature distribution in each of the honeycomb structures was suppressed.

It was possible to confirm that in each of Examples 17 to 20, the maximum thickness of each of electrode parts was in a range of 0.025 to 3 mm, and hence heat generation deviation was suitably evaluated as compared with Example 16. That is, it was possible to confirm that the deviation of the temperature distribution in each of the honeycomb structures was suppressed.

It was possible to confirm that in each of Examples 22 to 24, 0.5 time a center angle α of each of electrode parts (an angle θ of 0.5 time the center angle α) was in a range of 15 to 65°, and hence heat generation deviation was suitably evaluated as compared with Examples 21 and 25. That is, it was possible to confirm that the deviation of the temperature distribution in each of the honeycomb structures was suppressed.

INDUSTRIAL APPLICABILITY

A honeycomb structure of the present invention can suitably be utilized as a catalyst support for an exhaust gas purifying device which purifies an exhaust gas of a car.

DESCRIPTION OF REFERENCE NUMERALS

1: partition wall, 2: cell, 3: outer peripheral wall, 4: honeycomb structure part, 4a: one end portion of honeycomb structure part, 4b: the other end portion of honeycomb structure part, 5: side surface, 11: one end surface, 12: the other end surface, 13: side end edge, 15: outer peripheral edge, 21: electrode part, 21a: one end portion of electrode part, 21b: the other end portion of electrode part, 21X: center portion, 21Y: extended portion, 22: electrode terminal projecting portion, 22a: base, 22b: projection, 23: conductor, 25: thin portion, 26: cavity, 27: dent, 100, 200, 300, 400, 500, 501, 502a, 502b, 503, 600, 700, 800 and 900: honeycomb structure, A, B and C: region in electrode part, O: center, I: cell extending direction, M: region positioned at the center, X: peripheral direction, α: center angle, and θ: angle of 0.5 time the center angle.

The invention claimed is:
1. A honeycomb structure comprising:
a tubular honeycomb structure part having porous partition walls with which a plurality of cells extending from one end surface to the other end surface are formed to become through channels of a fluid and an outer peripheral wall positioned on an outermost periphery; and
a pair of electrode parts arranged on a side surface of the honeycomb structure part,
wherein an electrical resistivity of the honeycomb structure part is from 10 to 200 Ωcm,
each of the pair of electrode parts is formed into a band-like shape extending in a lengthwise direction in which the cells of the honeycomb structure part extend,
in a cross section perpendicular to the cell extending direction, the one electrode part in the pair of electrode parts is disposed opposite to the other electrode part in the pair of electrode parts via the center of the honeycomb structure part, and
the electrode part has portions having a thickness of 0 to 70% of the maximum thickness of the electrode part.

2. The honeycomb structure according to claim 1, wherein the electrode part is provided with through holes.

3. The honeycomb structure according to claim 1, wherein the maximum thickness of the electrode part is from 0.025 to 3 mm.

4. The honeycomb structure according to claim 2, wherein the maximum thickness of the electrode part is from 0.025 to 3 mm.

5. The honeycomb structure according to claim 1, wherein each of the pair of electrode parts is formed along a region between both end portions of the honeycomb structure part.

6. The honeycomb structure according to claim 2, wherein each of the pair of electrode parts is formed along a region between both end portions of the honeycomb structure part.

7. The honeycomb structure according to claim 3, wherein each of the pair of electrode parts is formed along a region between both end portions of the honeycomb structure part.

8. The honeycomb structure according to claim 4, wherein each of the pair of electrode parts is formed along a region between both end portions of the honeycomb structure part.

9. The honeycomb structure according to claim 1, wherein an electrical resistivity of the electrode part is from 0.01 to 100 Ωcm.

10. The honeycomb structure according to claim 2, wherein an electrical resistivity of the electrode part is from 0.01 to 100 Ωcm.

11. The honeycomb structure according to claim 3, wherein an electrical resistivity of the electrode part is from 0.01 to 100 Ωcm.

12. The honeycomb structure according to claim 4, wherein an electrical resistivity of the electrode part is from 0.01 to 100 Ωcm.

13. The honeycomb structure according to claim 5, wherein an electrical resistivity of the electrode part is from 0.01 to 100 Ωcm.

14. The honeycomb structure according to claim 6, wherein an electrical resistivity of the electrode part is from 0.01 to 100 Ωcm.

15. The honeycomb structure according to claim 7, wherein an electrical resistivity of the electrode part is from 0.01 to 100 Ωcm.

16. The honeycomb structure according to claim 8, wherein an electrical resistivity of the electrode part is from 0.01 to 100 Ωcm.

17. The honeycomb structure according to claim 1, wherein a conductor having an electrical resistivity lower than that of the electrode part is disposed on the surface of the electrode part.

* * * * *

UNITED STATES PATENT AND TRADEMARK OFFICE
CERTIFICATE OF CORRECTION

PATENT NO. : 9,516,702 B2
APPLICATION NO. : 13/922809
DATED : December 6, 2016
INVENTOR(S) : Takashi Noro et al.

Page 1 of 1

It is certified that error appears in the above-identified patent and that said Letters Patent is hereby corrected as shown below:

On the Title Page

Foreign Patent Documents
Please change: "DE 10 2011 083 2 A1 3/2012" to -- DE 10 2011 083 233 A1 03/2012 --

Signed and Sealed this
Twenty-third Day of May, 2017

Michelle K. Lee
*Director of the United States Patent and Trademark Office*